(12) United States Patent
Kang et al.

(10) Patent No.: US 10,827,303 B2
(45) Date of Patent: Nov. 3, 2020

(54) METHOD AND APPARATUS FOR PROVIDING PROXIMITY-BASED INFORMATION

(71) Applicant: Samsung Electronics Co., Ltd., Suwon-si (KR)

(72) Inventors: Dae-Ho Kang, Suwon-si (KR); Song-Yean Cho, Seoul (KR); Yeun-Woong Kyung, Seoul (KR); Chai-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/499,559

(22) PCT Filed: May 17, 2018

(86) PCT No.: PCT/KR2018/005661
§ 371 (c)(1),
(2) Date: Sep. 30, 2019

(87) PCT Pub. No.: WO2018/212607
PCT Pub. Date: Nov. 22, 2018

(65) Prior Publication Data
US 2020/0045497 A1 Feb. 6, 2020

(30) Foreign Application Priority Data

May 17, 2017 (KR) .................. 10-2017-0061071

(51) Int. Cl.
*H04W 4/021* (2018.01)
*H04W 4/21* (2018.01)
(Continued)

(52) U.S. Cl.
CPC ........ *H04W 4/021* (2013.01); *G06F 3/04842* (2013.01); *H04M 1/72569* (2013.01);
(Continued)

(58) Field of Classification Search
CPC ......... H04W 4/021; H04W 4/21; H04W 4/80; H04W 4/025; H04W 4/02; G06F 3/04842; H04M 1/72569
(Continued)

(56) References Cited

U.S. PATENT DOCUMENTS

2011/0029474 A1 2/2011 Lin
2015/0237470 A1 8/2015 Mayor et al.
(Continued)

FOREIGN PATENT DOCUMENTS

KR 10-2012-0052266 A 5/2012
KR 10-2014-0088345 A 7/2014
(Continued)

*Primary Examiner* — Inder P Mehra
(74) *Attorney, Agent, or Firm* — Jefferson IP Law, LLP

(57) ABSTRACT

The embodiments disclosed in the present specification relate to a method and an apparatus for providing proximity-based information. An electronic apparatus for providing proximity-based information according to various embodiments of the present invention comprises: a communication interface; a memory; and a processor electrically connected to the communication interface and the memory, wherein the processor may be set to obtain first context information from one or more programs running on the electronic apparatus, identify first location information corresponding to the first context information, transmit, to a server, first data including at least one of the first context information and the first location information, through the communication interface, receive, from the server, first event information on a point of interest corresponding to the transmitted first data, and store, in the memory, the received first event information on the point of interest. Other various embodiments are possible.

13 Claims, 17 Drawing Sheets

(51) Int. Cl.
  *H04W 4/80* (2018.01)
  *H04W 4/02* (2018.01)
  *H04W 4/23* (2018.01)
  *H04M 1/725* (2006.01)
  *G06F 3/0484* (2013.01)

(52) U.S. Cl.
  CPC ............ *H04W 4/025* (2013.01); *H04W 4/21* (2018.02); *H04W 4/80* (2018.02)

(58) Field of Classification Search
  USPC ...................................................... 455/456.3
  See application file for complete search history.

(56) References Cited

U.S. PATENT DOCUMENTS

| | | | | |
|---|---|---|---|---|
| 2015/0338234 | A1* | 11/2015 | Seastrom | G01C 21/3679 701/409 |
| 2016/0073229 | A1* | 3/2016 | Haro | H04W 4/021 455/456.3 |
| 2016/0132513 | A1* | 5/2016 | Lim | H04W 4/60 707/724 |
| 2016/0366551 | A1* | 12/2016 | Alsina | H04W 4/021 |
| 2017/0052967 | A1* | 2/2017 | Castillo | G06F 16/29 |

FOREIGN PATENT DOCUMENTS

| | | |
|---|---|---|
| KR | 10-1544462 B1 | 8/2015 |
| WO | 2014/030842 A1 | 2/2014 |
| WO | 2015/119371 A1 | 8/2015 |

\* cited by examiner

METHOD AND APPARATUS FOR PROVIDING PROXIMITY-BASED INFORMATION

CROSS-REFERENCE TO RELATED APPLICATION(S)

This application is a U.S. National Stage application under 35 U.S.C. § 371 of an International application number PCT/KR2018/005661, filed on May 17, 2018, which is based on and claimed priority of a Korean patent application number 10-10-2017-0061071, filed on May 17, 2017, in the Korean Intellectual Property Office, the disclosure of which is incorporated by reference herein in its entirety.

TECHNICAL FIELD

Embodiments of the disclosure relate to methods and apparatuses of providing proximity-based information.

BACKGROUND ART

With smartphones, tablet PCs, wearable devices, or other portable electronic devices in wide use, various services are coming out that use location information about portable electronic devices.

A representative example is the service where a location information provider sends out notifications or advertisements related to a particular area to an electronic device of a user when the user moves to the inside of a virtual border, 'geofence,' surrounding the particular area.

So-called proximity marketing, which identifies whether an electronic device and a place-of-interest or point-of-interest (POI) are proximate to each other and transfers coupons, menus, or POI information advertisers provide, may deliver a new experience to users and provide advertisers with a chance to advertise their POIs. What should be considered to provide proximity-based marketing information to users is a method of the electronic device to select a point-of-interest (POI) as a target for determination or a method of identifying whether the point-of-interest (POI) is proximate. Further, in a case where an electronic device is identified to be proximate to a point-of-interest (POI), there should also be considered a method of transferring the type of a service (e.g., delivery of a coupon or guide about amenities) to be provided to the user and services.

DETAILED DESCRIPTION OF THE INVENTION

Technical Problem

Various embodiments disclosed herein relate to methods of analyzing an interest of a user who holds an electronic device or the user's life pattern and providing information related to a point-of-interest (POI) to the user based on the results of analysis.

According to an embodiment of the present invention, an electronic device may address the issue where spam information related to a point-of-interest (POI) is indiscriminately delivered to the user only because the electronic device approaches the point-of-interest (POI). For example, according to an embodiment, an electronic device may obtain context information about the user of the electronic device even without a specific command or control and provide optimized marketing information to the user using the obtained context information and at least one piece of location information.

Technical Solution

According to various embodiments of the present invention, an electronic device providing proximity-based information comprises a communication interface, a memory, and a processor electrically connected with the communication interface and the memory, wherein the processor is configured to obtain first context information from one or more programs executed on the electronic device, identify first location information corresponding to the first context information, transmit first data including at least one of the first context information and the first location information to a server through the communication interface, receive, from the server, first point-of-interest event information corresponding to the transmitted first data, and store the received first point-of-interest event information in the memory.

According to various embodiments of the present invention, a method of providing proximity-based information may comprise obtaining first context information from one or more programs executed on an electronic device, identifying first location information corresponding to the first context information, transmitting first data including at least one of the first context information and the first location information to a server through a communication interface of the electronic device, receiving, from the server, point-of-interest event information corresponding to the transmitted first data, and storing the received point-of-interest event information in a memory of the electronic device.

According to various embodiments of the present invention, a server providing proximity-based information comprises a communication interface, a memory, and a processor electrically connected with the communication interface and the memory, wherein the processor is configured to obtain at least one piece of point-of-interest information from one or more first electronic devices through the communication interface and store the point-of-interest information in the memory, receive, from a second electronic device through the communication interface, data including at least one of first context information related to the second electronic device and first location information corresponding to the first context information, identify point-of-interest information corresponding to the received data among at least one piece of point-of-interest information stored in the memory, generate at least one piece of point-of-interest event information using the received data and the identified point-of-interest information, and transmit the generated point-of-interest event information to the second electronic device.

Advantageous Effects

According to an embodiment of the present invention, upon identifying that the user of an electronic device is proximate to a point-of-interest (POI), the electronic device may screen only information in which the user shows interest among myriad information related to the point-of-interest (POI) and provide the information to the user.

According to an embodiment of the present invention, a server may provide marketing information based on context information except for the user's personal information, thus addressing such issues as personal information leakage or privacy invasion which may occur when marketing information is provided.

An embodiment of the present invention may screen only users who show interest in point-of-interest (POI) information among a number of users positioned proximate to the point-of-interest (POI) and provide marketing information, thereby providing the optimized marketing content per user.

MODE FOR CARRYING OUT THE INVENTION

Figure 1:
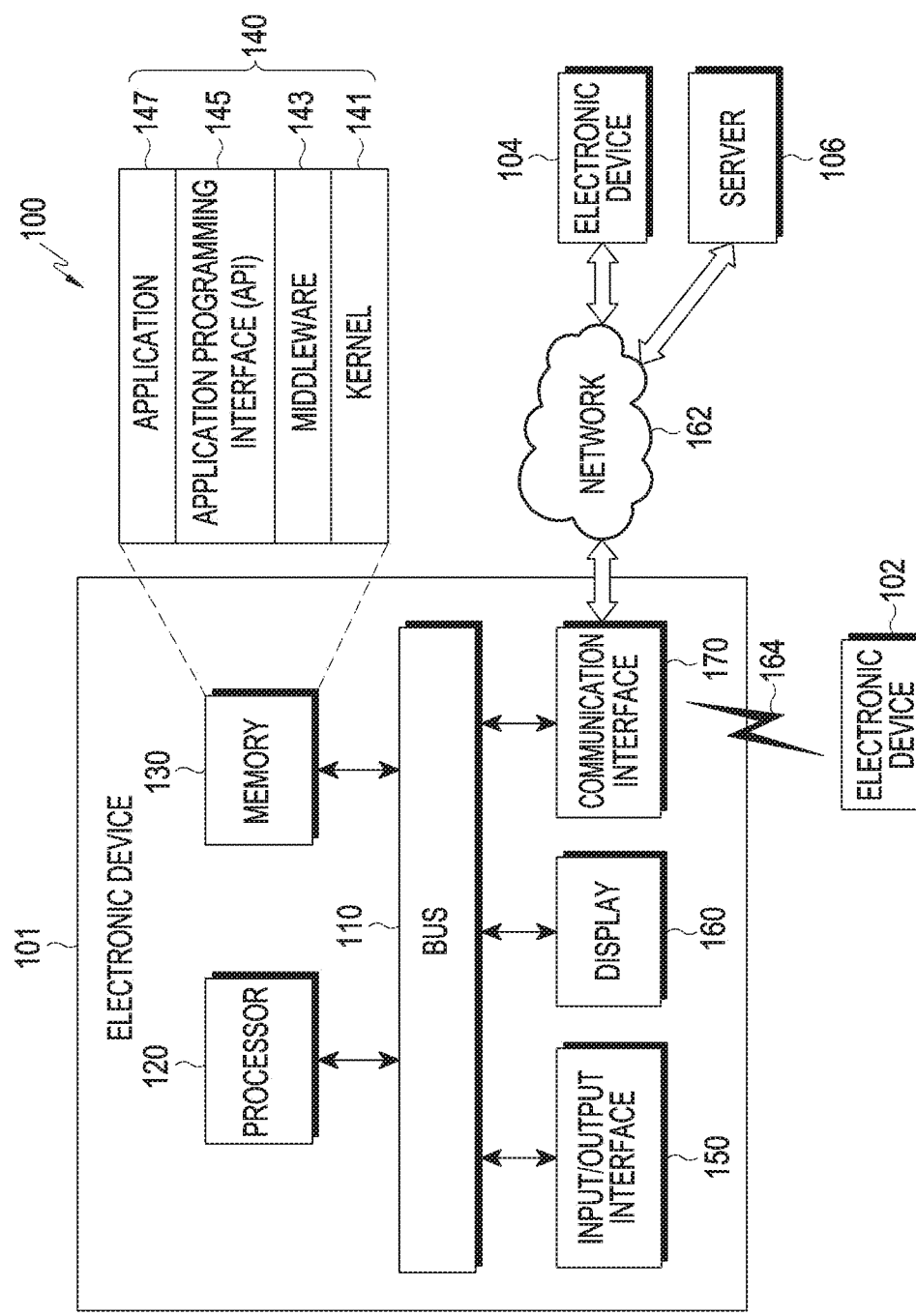
FIG. 1 is a block diagram illustrating an electronic device and a network according to various embodiments of the present invention.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device.

In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture, a building/structure or vehicle, an electronic board, an electronic signature receiving device, a projector, or various measurement devices (e.g., devices for measuring water, electricity, gas, or electromagnetic waves).

According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment, the memory 130 may store software and/or a program 140.

The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources. The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UNITS), wireless broadband (Wi-Bro), or global system for mobile communication (GSM). According to an embodiment of the present invention, the wireless communication may include at least one of, e.g., wireless-fidelity (Wi-Fi), light-fidelity (Li-Fi), Bluetooth, Bluetooth low power (BLE), ZigBee, near-field communication (NFC), magnetic secure transmission (MST), radio frequency (RF), or body area network (BAN) as denoted with element 164 of FIG. 1. According to an embodiment of the disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to various embodiments, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
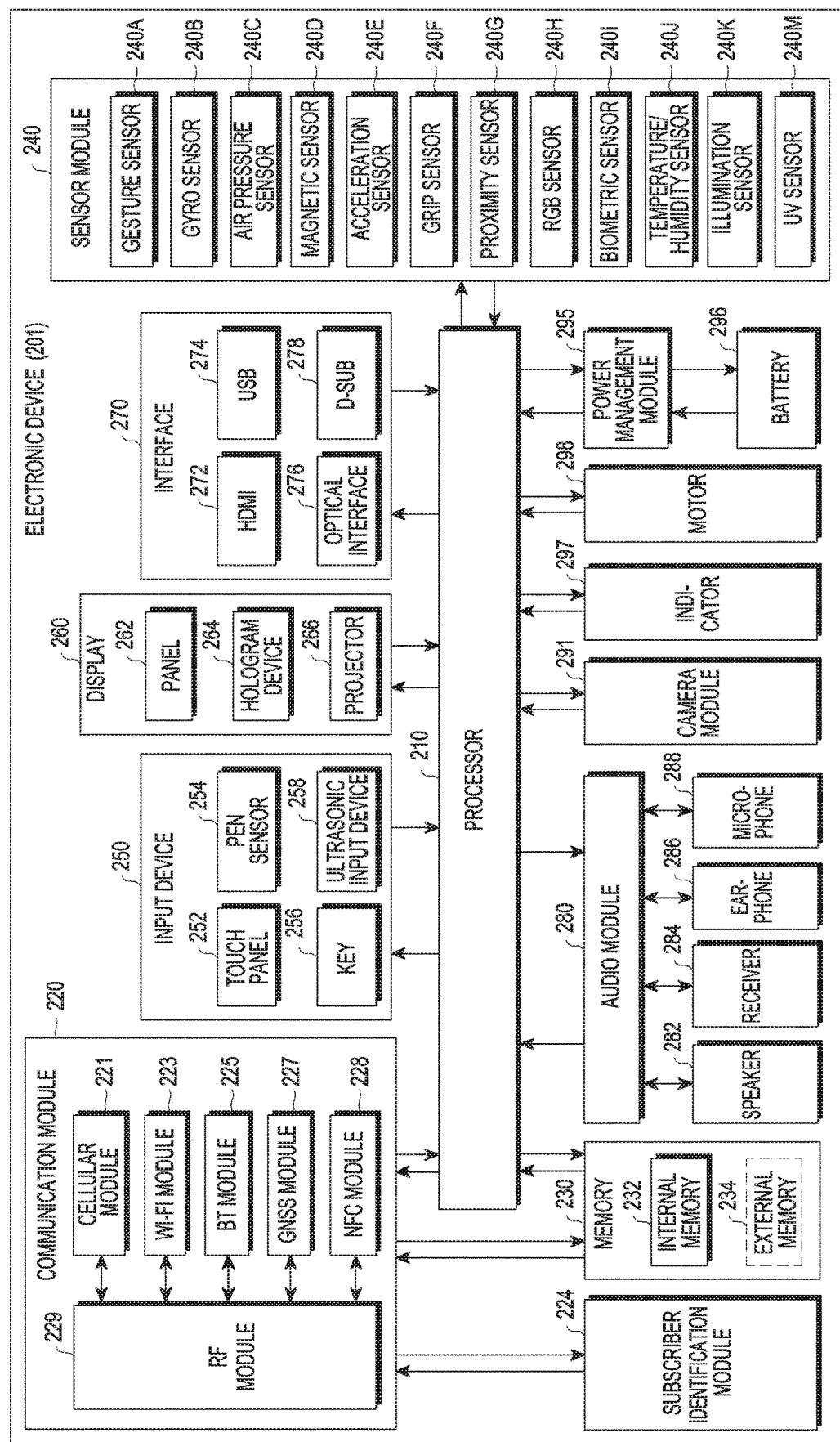
FIG. 2 is a block diagram illustrating an electronic device according to various embodiments of the present invention.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment of the present invention, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultraviolet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or keypad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. According to an embodiment of the present invention, the camera module 291 may include the whole or part of the camera module 180.

The power manager module 295 may manage power of the electronic device 201, for example. According to an embodiment, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

According to various embodiments of the present invention, an electronic device providing proximity-based information comprises a communication interface (e.g., 170), a memory (e.g., 130), and a processor (e.g., 120) electrically connected with the communication interface and the memory, wherein the processor is configured to obtain first context information from one or more programs executed on the electronic device, identify first location information corresponding to the first context information, transmit first data including at least one of the first context information and the first location information to a server through the communication interface, receive, from the server, first point-of-interest event information corresponding to the transmitted first data, and store the received first point-of-interest event information in the memory.

According to various embodiments of the present invention, in the electronic device of providing proximity-based information, the first context information may include at least one of second data extracted from the one or more programs and at least one keyword received through an input interface provided in the electronic device.

According to various embodiments of the present invention, in the electronic device of providing proximity-based information, the second data extracted from the one or more programs may include at least one of a keyword extracted from content provided through the one or more programs and a cookie for the one or more programs.

According to various embodiments of the present invention, in the electronic device of providing proximity-based information, the first location information may include at least one of location information related to the first context information and location information about the electronic device identified when the first context information is obtained.

According to various embodiments of the present invention, in the electronic device of providing proximity-based information, the first point-of-interest event information may include at least one of location information about a point-of-interest, a method of discovering the point-of-interest, content related to the point-of-interest, and a recommendation index for the point-of-interest.

According to various embodiments of the present invention, in the electronic device of providing proximity-based information, the processor may be configured to identify second location information corresponding to a current location of the electronic device, identify whether the electronic device is proximate to the point-of-interest based on the identified second location information and the first point-of-interest event information, and in a case where the electronic device is identified to be proximate to the point-of-interest at a preset distance, output content related to the point-of-interest.

According to various embodiments of the present invention, in the electronic device of providing proximity-based information, the processor may be configured to identify whether the electronic device is proximate to the point-of-interest using a method of discovering the point-of-interest included in the first point-of-interest event information.

According to various embodiments of the present invention, in the electronic device of providing proximity-based information, the processor may be configured to output the content using at least one method of displaying a user interface, outputting a sound signal, generating a vibration, or executing at least one program of the electronic device.

According to various embodiments of the present invention, in the electronic device of providing proximity-based information, the processor may be configured to, in a case where recognition information about the point-of-interest is identified from the obtained first context information, store the recognition information and an identifier of an object, which has provided the recognition information, in the memory, transmit third data including identifiers of all objects, which have provided the recognition information, and the recognition information, corresponding to the number of pieces of the recognition information stored in the memory exceeding a preset number, receive, from the server, second point-of-interest event information corresponding to the transmitted third data, and store the received second point-of-interest event information in the memory.

According to various embodiments of the present invention, in the electronic device of providing proximity-based information, the processor may be configured to identify second location information corresponding to a current location of the electronic device, identify whether the electronic device is proximate to the point-of-interest based on the identified second location information and the second point-of-interest event information, and in a case where the electronic device is identified to be proximate to the point-of-interest at a preset distance, output content related to the point-of-interest.

According to various embodiments of the present invention, a server providing proximity-based information comprises a communication interface (e.g., 170), a memory (e.g., 130), and a processor (e.g., 120) electrically connected with the communication interface and the memory, wherein the processor is configured to obtain at least one piece of point-of-interest information from one or more first electronic devices through the communication interface and store the point-of-interest information in the memory, receive, from a second electronic device through the communication interface, data including at least one of first context information related to the second electronic device and first location information corresponding to the first context information, identify point-of-interest information corresponding to the received data among at least one piece of point-of-interest information stored in the memory, generate at least one piece of point-of-interest event information using the received data and the identified point-of-interest information, and transmit the generated point-of-interest event information to the second electronic device.

According to various embodiments of the present invention, in the server of providing proximity-based information, the processor may be configured to receive at least one piece of feedback information from the second electronic device which has identified proximity to a point-of-interest based on the transmitted point-of-interest information and update the point-of-interest information stored in the memory using the at least one piece of feedback information received.

Figure 3:
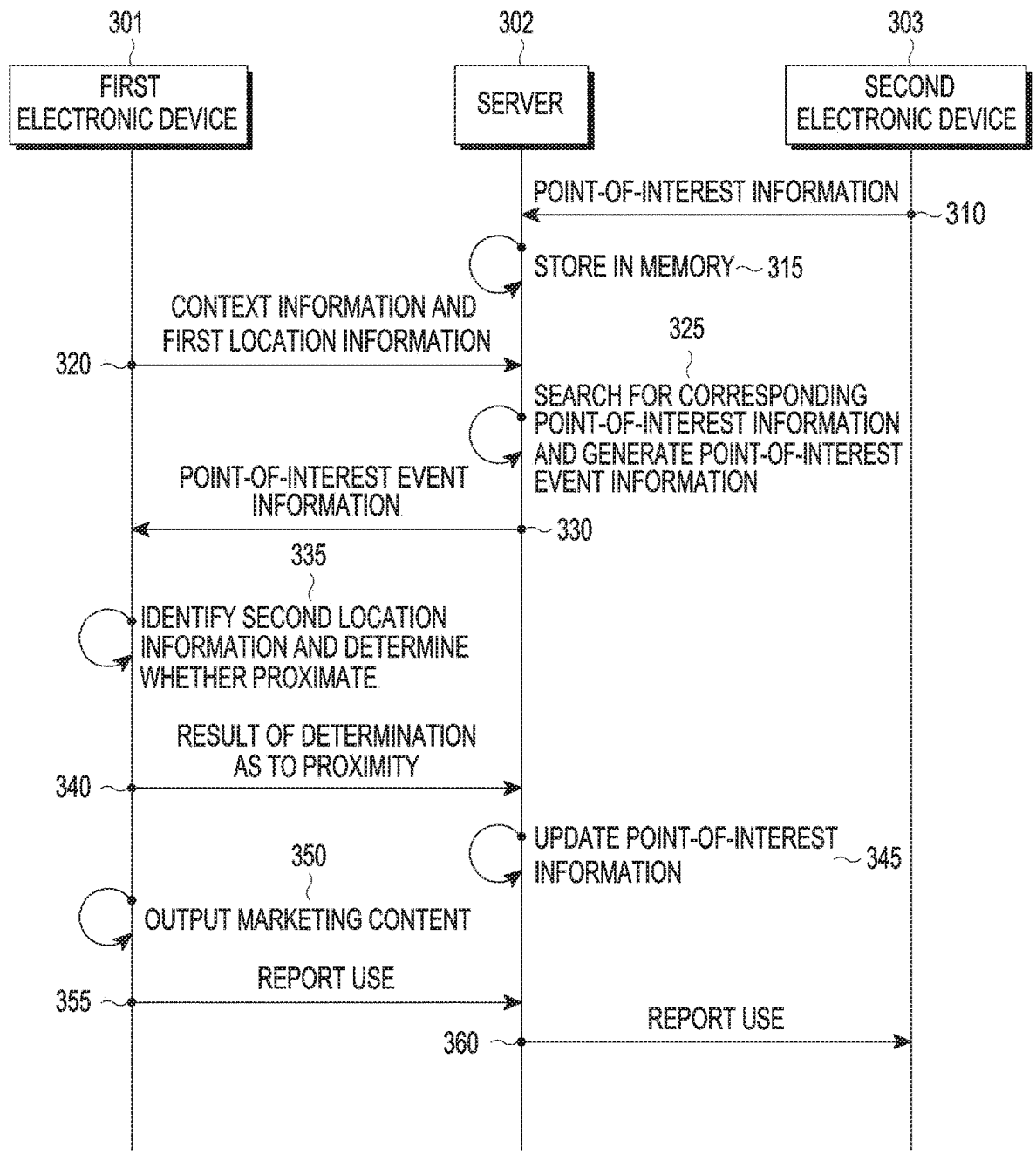
FIG. 3 is a view illustrating the relationship between electronic devices according to various embodiments of the present invention.

FIG. 3 is a view illustrating the relationship between electronic devices according to various embodiments of the present invention. According to an embodiment of the present invention, electronic devices 301 and 303 may be connected with at least one server 302 to provide proximity-based information. According to an embodiment, the electronic devices 301 and 303 and the server may include at least some of the components of the electronic device 101 of FIG. 1 or the electronic device 201 of FIG. 2.

Referring to FIG. 3, the first electronic device 301 and the second electronic device 303 may be connected with at least one server 302. Here, the first electronic device 301 may mean an electronic device which may receive proximity-based information from at least one server 302 and provide the received proximity-based information to the user of the first electronic device 301. The second electronic device 303 may mean an electronic device which may transmit, to at least one server 302, proximity-based information to be provided to the user of the first electronic device 301 in response to a command of a user (e.g., an advertiser)

According to an embodiment, in operation 310, the second electronic device 303 may transmit point-of-interest (POI) information to the server 302 in response to the command of the user (e.g., an advertiser). The point-of-interest (POI) information may include at least one of location information about the point-of-interest (POI), a discovery method of the point-of-interest (POI), a context (e.g., keyword) associated with the point-of-interest (POI), content related to the point-of-interest (POI), and a recommendation index for the point-of-interest (POI).

According to an embodiment, point-of-interest or place-of-interest (POI) may mean a store of the user (e.g., an advertiser) or a predetermined size of area (e.g., geofence) set by the user. Thus, the location information about the point-of-interest (POI) may include at least one coordinates indicating the address, latitude, and longitude of the store or building or geofence information indicating the predetermined size of area. The location information about the point-of-interest (POI) may include radio footprint information such as macro cell ID/micro cell ID/femto cell ID, WiFi BSSID/WiFi SSID, or Bluetooth Beacon ID. Meanwhile, the first electronic device 301 may transmit at least one piece of data, which is obtained while identifying whether it is proximate to the point-of-interest (POI), to the server 302, and the server 302 may correct or update the location information about the point-of-interest (POI) based on the received data.

According to an embodiment, the method of discovering the point-of-interest (POI) may include information available upon identifying whether the first electronic device 301 is proximate to the point-of-interest (POI). For example, in a case where the cell ID of a base station is primarily used and the BSSID of a Wi-Fi access point (AP) installed in the point-of-interest (POI) is secondarily used to identify whether it is proximate to the point-of-interest (POI), the method of discovering the point-of-interest (POI) may include the cell ID of the base station and the BSSID of the Wi-Fi AP. In this case, the first electronic device 301 may periodically detect the cell ID of the base station and the BSSID of the Wi-Fi AP included in the method of discovering the point-of-interest (POI) and, if the cell ID of the base station and the BSSID of the Wi-Fi AP are detected, identify that the first electronic device 301 is proximate to the point-of-interest (POI).

According to an embodiment, the content (e.g., marketing content) related to the point-of-interest (POI) may be content that the user (e.g., an advertiser) of the point-of-interest (POI) provides and may include menus, coupons, promotion information, or point-of-interest (POI) amenity information that the user provides. For example, the content that the user advertising at an airport provides may include, e.g., real-time flight information, flight schedule, airport amenity information, or departure/arrival guides. The content that the user advertising a cafe provides may include a menu or discount coupons. According to an embodiment, the point-of-interest (POI)-related content may be provided in various forms, e.g., as images, text, or uniform resource identifier (URI).

According to an embodiment, the recommendation index for the point-of-interest (POI) may mean information used upon identifying the priority of discovery among a plurality of pieces of point-of-interest (POI) information provided to the first electronic device 301. The recommendation index for the point-of-interest (POI) may previously be produced considering the potential customer or keyword corresponding to the point-of-interest (POI) information when the point-of-interest (POI) information is generated through the second electronic device 303 or the point-of-interest (POI) information is registered in at least one server 302. According to an embodiment, in a case where at least one server 302 receives at least one piece of data from the first electronic device 301, the at least one server 302 may produce a recommendation index for the point-of-interest (POI) or update a previously produced recommendation index for the point-of-interest (POI) considering the at least one piece of data received from the first electronic device 301.

According to an embodiment, in operation 315, the server 302 may store the point-of-interest (POI) information obtained from the second electronic device 303 in the memory of the server 302. The server 302 may manage a list of second electronic devices 303 which may communicate with the server 302 through a sign-up and authentication process. Accordingly, the user (e.g., an advertiser) may register, modify, and manage the point-of-interest (POI) information through the second electronic device 303 which has been registered in the server 302.

According to an embodiment, the point-of-interest (POI) information stored in the memory of the server 302 may be registered, modified, and managed through various routes. For example, the user (e.g., an advertiser) of the point-of-interest (POI) may access the server 302 using an application installed on the second electronic device 303 or a separate electronic device, e.g., a web console, and the user (e.g., an advertiser) of the point-of-interest (POI), who has accessed the server 302, may register context associated with the point-of-interest (POI). For example, the user (e.g., an advertiser) of "JFK airport" may register such keywords as "airport," "JFK," "JFK airport," or "Boston airport," in the server 302. Or, in a case where the information associated with the point-of-interest (POI) is among the pieces of information received from the first electronic device 301, the server 302 may modify or manage the point-of-interest (POI) information stored in the memory of the server 302 using the context information included in the information associated with the point-of-interest (POI).

According to an embodiment, the server 302 may update the point-of-interest (POI) information stored in the memory of the server 302 using the information obtained from an external device other than the second electronic device 303. For example, the server 302 may obtain location information from at least one external device proximate to the point-of-interest (POI) and update the point-of-interest (POI) information stored in the memory of the server 302. Or, in a case where payment is performed in the point-of-interest (POI) through at least one external device, the server 302 may obtain payment information and update the point-of-interest (POI) information stored in the memory of the server 302 using time information, product information, or location information included in the payment information. For example, in a case where there is a payment platform the server 302 provides, and the external device performs payment in at least one point-of-interest (POI) using the payment platform, the server 302 may obtain payment-related information (location information at the time of payment, information about the product purchased by the payment, or a keyword associated with the point-of-interest (POI)). Here, the external device may be the first electronic device 301.

According to an embodiment, in operation 320, the first electronic device 301 may transmit the context information and first location information to at least one server 302. Context information may mean information obtained from one or more programs (e.g., 140) executable on the first electronic device 301. For example, the first electronic device 301 may obtain, as the context information, at least one keyword identified from a web browser application running on the first electronic device 301. Or, the first electronic device 301 may obtain, as the context information, weather, place, or schedule from a scheduling application running on the first electronic device 301.

According to an embodiment, the context information may mean information obtained from one or more programs running on the first electronic device 301, but is not limited thereto. The context information may be obtained through at least some of the components of the first electronic device 301. For example, the first electronic device 301 may obtain at least one piece of data stored in the memory of the first electronic device 301, as the context information. Or, the first electronic device 301 may obtain, as the context information, data obtained periodically or in real-time from at least one sensor provided in the first electronic device 301. Or, the first electronic device 301 may obtain, as the context information, location information about the place where the user of the first electronic device 301 frequently visits or stays long based on location information about the first electronic device 301 which is detected through the communication interface (e.g., 170 or 220) of the first electronic device 301.

According to an embodiment, the first location information in operation 320 may mean location information related to the context information. For example, the first location information may include location information about the first electronic device 301 when the context information is obtained. Or, the first location information may include location information about the place that the context information indicates. For example, in a case where the keyword "JFK airport" is obtained from a web browser application running on the first electronic device 301, the first electronic device 301 may store "JFK airport" as the context information in the memory while simultaneously storing the address of "JFK airport", as first location information, in the memory. Or, in a case where the location of the first electronic device 301 when "JFK airport" is obtained as the context information, the first electronic device 301 may store "Boston" as the first location information in the memory. Then, the first electronic device 301 may transmit the first location information and context information stored in the memory to the server 302.

According to an embodiment, in operation 325, the server 302 may search for point-of-interest (POI) information corresponding to the context information and first location information received from the first electronic device 301 and generate point-of-interest (POI) event information based on the result of search. For example, in a case where at least one of the address of "JFK airport" and "Boston" as the first location information and the context information "JFK airport" are received from the first electronic device 301, the server 302 may search for the point-of-interest (POI) information including the keyword "JFK airport" among a plurality of pieces of point-of-interest (POI) information stored in the memory. Or, the server 302 may search for the point-of-interest (POI) information registered by the user (e.g., an advertiser) located in a place proximate to the address of "JFK airport" among the plurality of pieces of point-of-interest (POI) information stored in the memory. Or, the server 302 may identify whether there is point-of-interest (POI) information which has been provided to other user who has searched for "JFK airport" in "Boston" among the plurality of pieces of point-of-interest (POI) information stored in the memory.

According to an embodiment, in a case where at least one piece of point-of-interest (POI) information is searched from the memory of the server 302, the server 302 may generate point-of-interest (POI) event information using the at least one piece of point-of-interest (POI) information searched. Here, the point-of-interest (POI) event information may include the whole or part of the data included in the point-of-interest (POI) information. Meanwhile, the server 302 may combine the plurality of pieces of point-of-interest (POI) information stored in the memory, thereby generating the point-of-interest (POI) event information. For example, the server may extract relevant data among pieces of data included in the plurality of pieces of point-of-interest (POI) information based on at least one piece of context information or first location information received from the first electronic device 301 and use the extracted data in generating the point-of-interest (POI) event information. In other words, the server 302 may combine the pieces of point-of-interest (POI) information stored in the memory of the server 302 and generate the point-of-interest (POI) event information to provide the optimized information to the first electronic device 301.

In the above embodiment, the point-of-interest (POI) event information generated based on the address of "JFK airport" and the context information "JFK airport" received from the first electronic device 301 may include at least one of location information of "JFK airport", a discovery method of "JFK airport", a context (e.g., keyword) associated with "JFK airport", content related to "JFK airport", and a recommendation index for "JFK airport".

According to an embodiment, the point-of-interest (POI) event information generated based on "Boston" and the context information "JFK airport" received from the first electronic device 301 may include bus company information available when moving from Boston to "JFK airport" or information about travel agencies in Boston which have a promotion. For example, the point-of-interest (POI) event information about the bus company available when moving from Boston to "JFK airport" may include at least one of location information about the bus company or bus station, a discovery method of the bus company or terminal, content related to the bus company, and a recommendation index for the bus company. Likewise, the point-of-interest (POI) event information about the travel agency in Boston which has a promotion may include at least one of location information about the travel agency, a discovery method of the travel agency, content related to the travel agency, and a recommendation index for the travel agency.

According to an embodiment, in operation 330, the first electronic device 301 may receive at least one piece of point-of-interest (POI) event information from the server 302. The first electronic device 301 may store the received point-of-interest (POI) event information in the memory of the first electronic device 301.

According to an embodiment, in operation 335, the first electronic device 301 may identify second location information corresponding to the movement of the first electronic device 301. For example, the second location information may mean the current location of the first electronic device 301. According to an embodiment, the first electronic device 301 may detect that the changed current location of the first electronic device 301 is "JFK airport". Or, the first electronic device 301 may detect that the current location of the first electronic device 301 is a place adjacent to the bus station in Boston or the Boston travel agency.

According to an embodiment, when the first electronic device 301 moves toward "JFK airport", the first electronic device 301 may identify whether the first electronic device 301 and "JFK airport" are proximate to each other using the point-of-interest (POI) event information related to "JFK airport" stored in the memory of the first electronic device 301. For example, the first electronic device 301 may identify whether the first electronic device 301 and "JFK airport" are proximate to each other using a method of discovering the point-of-interest (POI) included in the point-of-interest (POI) event information. If a condition according to the method of discovering the point-of-interest (POI) is met so that the first electronic device 301 is identified to be proximate to "JFK airport", the first electronic device 301 may transmit (operation 340) the result of the identification to the server 302 and may output (operation 350) content related to the point-of-interest (POI) included in the point-of-interest (POI) event information.

According to an embodiment, the point-of-interest (POI)-related content output in operation 350 may be one that the user (e.g., an advertiser) has registered in the server 302 using the second electronic device 303. For example, the content related to "JFK airport" may include real-time flight information about "JFK airport", flight schedule, airport amenity information, or departure/arrival guides. The first electronic device 301 may output the point-of-interest (POI)-related content in various forms, e.g., as an image, text, or URI. The user of the first electronic device 301 may obtain various pieces of information related to the point-of-interest (POI) through the output point-of-interest (POI)-related content.

According to an embodiment, in a case where the point-of-interest (POI)-related content is used, the first electronic device 301 may report use of the point-of-interest (POI)-related content to the server 302 in operation 355.

According to an embodiment, in operation 345, the server 302 may update the point-of-interest (POI) information stored in the memory of the server 302 using the result of identification as to proximity received from the first electronic device 301. The server 302 may generate more exact point-of-interest (POI) event information than the prior information using the updated point-of-interest (POI) information.

According to an embodiment, in operation 360, the server 302 may report use of the point-of-interest (POI)-related content to the second electronic device 303 based on the use report received from the first electronic device 301.

Some of the operations of the first electronic device 301, the second electronic device 303, and the server 302 may be omitted or repeated according to an embodiment of the present invention. The operations are merely intended for an embodiment of the present invention and the present invention is not limited thereto.

According to another embodiment, a system may include a first electronic device 301, a server 302, and a second electronic device 303. The second electronic device 303 may generate point-of-interest (POI) information including at least one of content a user provides, a method of discovering a user, a keyword related to a user, and location information about a user (e.g., an advertiser) and register the point-of-interest (POI) information in a point-of-interest (POI) database (DB) managed by the server 302. Meanwhile, the operation of generating the point-of-interest (POI) information may be performed through at least one program (e.g., 140) installed on the second electronic device or a point-of-interest (POI) database managing module provided in the server 302.

According to an embodiment, the first electronic device 301 may obtain context information which deserves the user's interest through various activities of the user of the first electronic device 301. The first electronic device 301 may transmit first data including the location of the first electronic device 301 and the obtained context information to the server 302.

According to an embodiment, the server 302 having received the first data may screen users (e.g., advertisers) related to the context information included in the first data from the point-of-interest (POI) database. Further, the server 302 may additionally screen users (e.g., advertisers) present within a predetermined radius of the first electronic device 301 based on the location information included in the first data. The server 302 may generate point-of-interest (POI) event information per screened user (e.g., advertiser) and transmit the generated per-user (e.g., advertiser) point-of-interest (POI) event information to the first electronic device 301. Here, the point-of-interest (POI) event information may include at least one of the content the user (e.g., an advertiser) provides, a discovery method of the user (e.g., an advertiser), and the location information about the user (e.g., an advertiser). Meanwhile, the server 302 may generate a plurality of pieces of point-of-interest (POI) event information based on the first data received from the first electronic device 301 and transmit at least one piece of point-of-interest (POI) event information to the first electronic device 301.

According to an embodiment, the first electronic device 301 having received the point-of-interest (POI) event information may store the point-of-interest (POI) event information in the memory of the first electronic device 301. Further, the first electronic device 301 may use an available location measuring technique to identify periodically or in real-time whether it is proximate to the user (e.g., an advertiser) corresponding to the point-of-interest (POI) event information stored in the memory of the first electronic device 301. If the first electronic device 301 and the user (e.g., an advertiser) are proximate to each other, the first electronic device 301 may output the content included in the point-of-interest (POI) event information about the user (e.g., an advertiser) by way of the display, vibration motor, or speaker of the first electronic device 301.

Meanwhile, according to an embodiment, the first electronic device 301 may identify whether it is proximate to the user (e.g., an advertiser) using a positioning technique with high accuracy, such as GPS, and transmit location information, such as base station cell ID or Wi-Fi AP ID, which may additionally be obtained at the time of identifying proximity to the user (e.g., an advertiser), to the server 302. The first electronic device 301 may visit the user (e.g., an advertiser) who has provided content (e.g., marketing content) and conducted such an activity as payment or using a coupon and transmit information related to the product purchased or coupon used to the server 302. The server 302 may update, e.g., the content related to the user (e.g., an advertiser), the method of discovering the user (e.g., an advertiser), the keyword related to the user (e.g., an advertiser), or location information about the user (e.g., an advertiser) in the point-of-interest (POI) database using the received information and may thus provide more exact proximity-based information.

Figure 4:
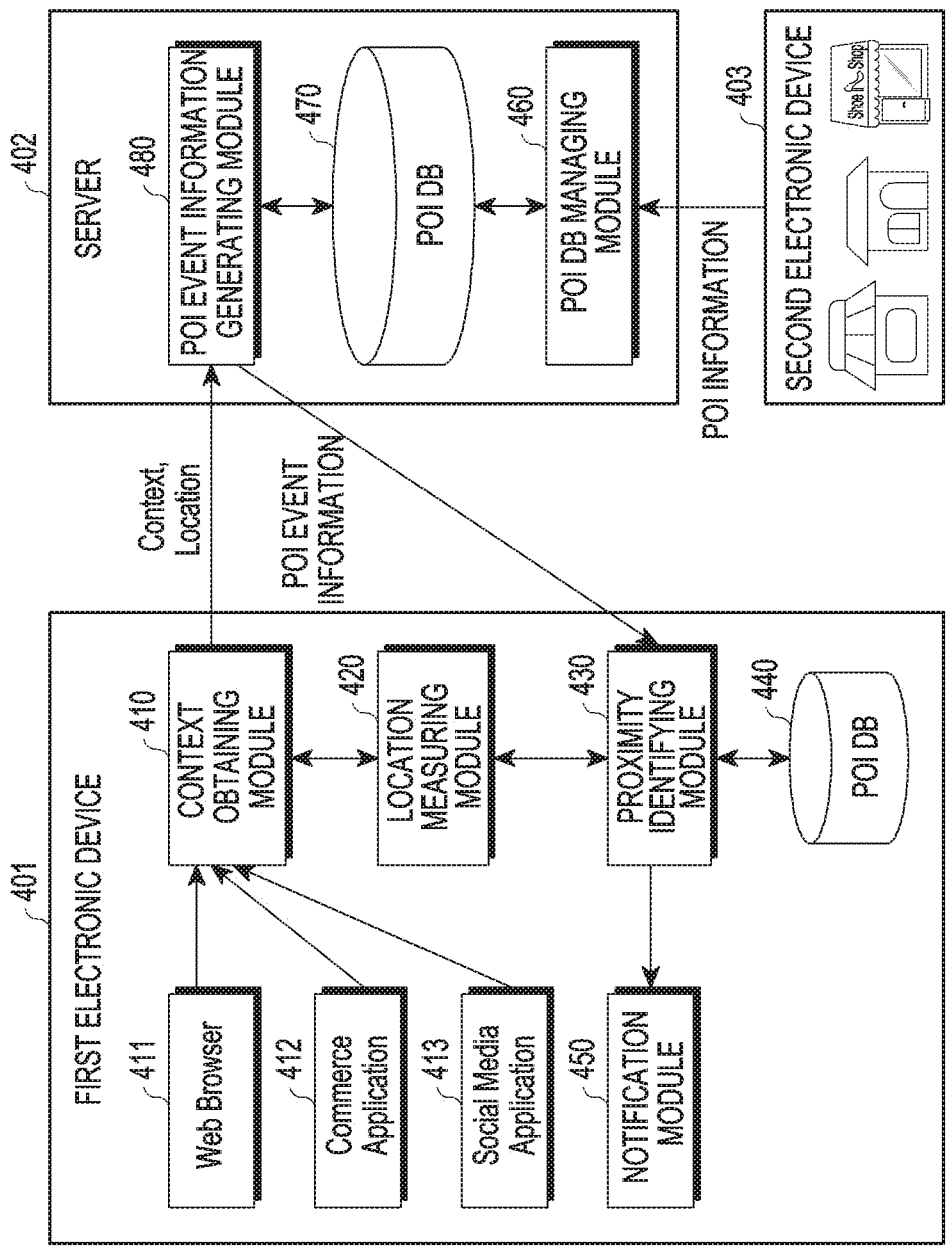
FIG. 4 is a block diagram illustrating components included in electronic devices and the relationship between the components according to various embodiments of the present invention.

FIG. 4 is a block diagram illustrating components included in electronic devices and the relationship between the components according to various embodiments of the present invention. Referring to FIG. 4, according to an embodiment of the present invention, a system may include a first electronic device 401, at least one server 402, and a second electronic device 403.

According to an embodiment, the second electronic device 403 may transmit and receive data to/from the server 402 through various communication interfaces (e.g., 170) as a terminal device (e.g., smartphone, tablet, laptop PC, or desktop PC). The second electronic device 403 may register point-of-interest (POI) information in the server 402 in response to a user (e.g., an advertiser)'s command.

According to an embodiment, the first electronic device 401 may mean an electronic device which may communicate data with the server 402 via a short-range wireless communication interface, such as WLAN, or a wireless cellular interface, such as 3GPP or LTE, as a mobile electronic device, such as smartphone, tablet, or laptop PC. The first electronic device 401 may include a location measuring module 420 including at least one or more of, e.g., GPS, mobile triangulation, Wi-Fi AP detector, and BLE beacon detector which are able to identify its current location. The location measuring module 420 may store location information about the place where the first electronic device 401 frequently visits or stays long in the point-of-interest (POI) DB 440.

According to an embodiment, the first electronic device 401 may include a context obtaining module 410 capable of obtaining context information which deserves the user's interest from the user's various activities. The context obtaining module 410 may obtain context information considering the user's interest level. For example, in a case where a web browser 411 runs on the first electronic device 401 and there is a word frequently entered or a button clicked often through an input device (e.g., 250) of the first electronic device 401, the context obtaining module 410 may obtain information related to the word or button as context information. In a case where there is a webpage browsed frequently or output for a long time on the web browser 411 running on the first electronic device 401, the context obtaining module 410 may obtain at least one keyword included in the webpage as context information. In a case where there is content frequently used or content corresponding to entry of favor (e.g., Like) on a commerce application 412 or social media application 413 running on the first electronic device 401, the context obtaining module 410 may obtain information related to the content as at least one piece of context information.

Meanwhile, according to an embodiment, the first electronic device 401 may transmit, to the server 402, first data including at least one piece of context information obtained through the context obtaining module 410 and at least one piece of location information obtained through the location measuring module 420.

According to an embodiment, at least one server 402 may include a point-of-interest (POI) DB managing module 460, a point-of-interest (POI) DB 470, and a point-of-interest (POI) event information generating module 480. The point-of-interest (POI) DB 470 is a component capable of storing point-of-interest (POI) information users (e.g., advertisers) provide and may store the point-of-interest (POI) information generated through the second electronic device 403.

Here, the point-of-interest (POI) information may include, e.g., location information about the point-of-interest (POI), a keyword related to the point-of-interest (POI), a discovery method of the point-of-interest (POI), and content related to the point-of-interest (POI). Here, the keyword related to the point-of-interest (POI) may be a word or sentence related to the service or product that the user (e.g., an advertiser) in the point-of-interest (POI) provides and may be a hash tag including at least one word. Meanwhile, the second electronic device 403 may access the server 402 in response to a command of the user (e.g., an advertiser) and may generate, register, or modify the point-of-interest (POI) information through the point-of-interest (POI) DB managing module 460 provided in the server 402.

According to an embodiment, the point-of-interest (POI) event information generating module 480 may identify at least one piece of point-of-interest (POI) information among a plurality of pieces of point-of-interest (POI) information stored in the point-of-interest (POI) DB 470 based on first data including at least one piece of location information and context information received from the first electronic device 401. For example, the point-of-interest (POI) event information generating module 480 may identify the point-of-interest (POI) information related to the context information received from the first electronic device 401 using the keyword related to the point-of-interest (POI). The point-of-interest (POI) event information generating module 480 may identify point-of-interest (POI) information about the user (e.g., an advertiser) who is located within a predetermined radius from at least one piece of location information received from the first electronic device 401 using the location information about the point-of-interest (POI).

According to an embodiment, the point-of-interest (POI) event information generating module 480 may generate point-of-interest (POI) event information that is to be transmitted to the first electronic device 401 using the identified point-of-interest (POI) information. Here, the point-of-interest (POI) event information may include the whole or part of the point-of-interest (POI) information. The point-of-interest (POI) event information may include a recommendation index for the point-of-interest (POI) available when identifying the priority of discovery among the plurality of pieces of point-of-interest (POI) information.

According to an embodiment, the server 402 may transmit the generated point-of-interest (POI) event information through the communication interface (e.g., 170) to the first electronic device 401. According to an embodiment, the server 402 may generate and transmit a plurality of pieces of point-of-interest (POI) event information corresponding to the first data received from the first electronic device 401.

Meanwhile, according to an embodiment, in a case where the first data is received from the first electronic device 401, the server 402 may refrain from storing at least one piece of location information and context information included in the first data in the memory of the server 402. In other words, since the at least one piece of location information and context information included in the first data are used only when generating the point-of-interest (POI) event information to be transmitted to the first electronic device 401 and, immediately after generated, discarded, the server 402 may provide proximity-based information to the first electronic device 401 without gathering the user's personal information. Thus, according to an embodiment, the server 402 may be freed from legal or technical issues that may arise when the user's personal information is used or processed. In a case where the user authorizes to use his or her personal information, the server 402 may, however, store the context information and at least one piece of location information included in the first data in the memory of the server 402. In this case, the server 402 may provide various precise contents (e.g., marketing content) to the user of the first electronic device 401 using the stored first data.

According to an embodiment, the first electronic device 401 may receive at least one piece of point-of-interest (POI) event information from the server 402 and store the information in the point-of-interest (POI) DB 440 of the first electronic device 401. A proximity identifying module 430 provided in the first electronic device 401 may identify whether the first electronic device 401 and the point-of-interest (POI) are proximate to each other based on the current location of the first electronic device 401 and at least one of the recommendation index for the point-of-interest (POI), method of discovering the point-of-interest (POI), and location information about the point-of-interest (POI) included in the point-of-interest (POI) event information. For example, in a case where a method of identifying the distance between the current location of the first electronic device 401 and the location of the point-of-interest (POI) using the GPS of the first electronic device 401 is proposed as the point-of-interest (POI) discovery method, the proximity identifying module 430 may measure the current location of the first electronic device 401 through the GPS module provided in the first electronic device 401. The proximity identifying module 430 may compare the measured current location of the first electronic device 401 with the point-of-interest (POI) location information included in the point-of-interest (POI) event information to thereby identify the distance between the location of the point-of-interest (POI) and the current location of the first electronic device 401 and, if the identified distance is a preset value or less, identify that the first electronic device 401 and the point-of-interest (POI) are proximate to each other.

According to another embodiment, the proximity identifying module 430 may identify the proximity by calculating the physical distance between the location of the point-of-interest (POI) and the current location of the first electronic device 401 or identify whether the current location of the first electronic device 401 and the location of the point-of-interest (POI) are proximate to each other according to a preset radio footprint ID, identifier, or whether there is a type match. For example, the proximity identifying module 430 may identify whether the first electronic device 401 and the point-of-interest (POI) are proximate to each other via one or more steps based on the current location of the first electronic device 401 and point-of-interest (POI) discovery method included in the point-of-interest (POI) event information. For example, in a case where a method of using the cell ID of a base station primarily and BLE beacon information or information about the Wi-Fi AP installed in the point-of-interest (POI) secondarily is suggested as the point-of-interest (POI) discovery method, the proximity identifying module 430 may primarily identify whether the first electronic device 401 and the point-of-interest (POI) are proximate to each other by comparing the cell ID of the base station connected with the first electronic device 401 with the base station cell ID included in the point-of-interest (POI) discovery method. If the cell ID of the base station connected with the first electronic device 401 is identified to be identical to the base station cell ID included in the point-of-interest (POI) discovery method, the proximity identifying module 430 may activate the short-range wireless communication interface proposed through the point-of-interest (POI) discovery method, thereby discovering the BLE beacon information or information about the Wi-Fi AP installed in the point-of-interest (POI). Finally, in a case where the BLE beacon information or information about the Wi-Fi AP installed in the point-of-interest (POI) is discovered, the proximity identifying module 430 may identify that the first electronic device 401 and the point-of-interest (POI) are proximate to each other. Meanwhile, in a case where a method of using the BLE beacon information or information about the Wi-Fi AP installed in the point-of-interest (POI) is proposed as the point-of-interest (POI) discovery method, the point-of-interest (POI) discovery method may further include information about the channel the Wi-Fi AP in the point-of-interest (POI) uses or Bluetooth beacon channel information.

According to an embodiment, in a case where the first electronic device 401 and the point-of-interest (POI) are identified to be proximate to each other, the notification module 450 of the first electronic device 401 may output content related to the point-of-interest (POI) included in the point-of-interest (POI) event information. For example, in a case where the point-of-interest (POI)-related content is provided as an image or text, the notification module 450 may display the point-of-interest (POI)-related content through the display of the first electronic device 401 or output the point-of-interest (POI)-related content in various forms, e.g., as a sound or vibration, using a component of the first electronic device 401. Meanwhile, in a case where the point-of-interest (POI)-related content is provided as URI, the proximity identifying module 430 may access the URI to thereby obtain the point-of-interest (POI)-related content automatically. In this case, the proximity identifying module 430 may receive the point-of-interest (POI)-related content using a wireless mobile communication network, such as 3GPP or LTE. The proximity identifying module 430 may access the AP installed in the point-of-interest (POI) and receive the point-of-interest (POI)-related content so as to save costs due to use of the wireless mobile communication network.

According to an embodiment, the first electronic device 401 may transmit, to the server 402, various pieces of location information obtained upon identifying whether it is proximate to the point-of-interest (POI) or information generated as the point-of-interest (POI) is used, as feedback data. For example, the first electronic device 401 may identify the proximity using a positioning technique with relatively high accuracy, such as GPS, and transmit the cell ID of a nearby base station or information about the Wi-Fi AP in an ambient store as obtained at the time of identifying the proximity, to the server 402. The first electronic device 401 used to visit the point-of-interest (POI) and purchase a product or service may transmit information about the coupon used by the user or information about the product purchased to the server 402. Meanwhile, receiving the feedback data from the first electronic device 401, the server 402 may update at least one piece of point-of-interest (POI) information stored in the point-of-interest (POI) DB 470 using the received feedback data. The updated point-of-interest (POI) information may be used later to generate point-of-interest (POI) event information, and the accuracy of the point-of-interest (POI) event information may be enhanced even without receiving additional information from the second electronic device 403. With such machine learning, the server 402 may provide high-accurate proximity-based information.

According to an embodiment, when a particular condition is met, one or more pieces of point-of-interest (POI) event information stored in the point-of-interest (POI) DB 440 of the first electronic device 401 may be deleted from the point-of-interest (POI) DB 440. For example, in a case where the first electronic device 401 and the point-of-interest (POI) are identified to be proximate to each other by the proximity identifying module 430 and the point-of-interest (POI)-related content is output by the notification module 450, the related point-of-interest (POI) event information may be deleted from the point-of-interest (POI) DB 440. In a case where the first electronic device 401 and the point-of-interest (POI) fail to be located proximate to each other within a predetermined time after the point-of-interest (POI) event information has been received by the first electronic device 401, the related point-of-interest (POI) event information may be deleted from the point-of-interest (POI) DB 440. Thus, the first electronic device 401 may manage the point-of-interest (POI) DB 440 and may minimize the likelihood of bothering the user with point-of-interest (POI) event information which the user may have no interest in.

According to an embodiment, one or more pieces of point-of-interest (POI) event information stored in the point-of-interest (POI) DB 440 of the first electronic device 401 may be updated periodically or in an event-driven manner. For example, the first electronic device 401 may identify the valid time for the point-of-interest (POI)-related content and then update the valid time by update. Or, the first electronic device 401 may receive again, from the server 402, the same content as the point-of-interest (POI)-related content whose valid time is about to end. The period at which the point-of-interest (POI) DB 440 is updated or the event to invoke an update may be defined in various types. For example, the first electronic device 401 may access the server 402 and update the point-of-interest (POI) DB 440 at each hour. Or, the first electronic device 401 may update the point-of-interest (POI) DB 440 only when the first electronic device 401 connects to the Wi-Fi AP.

Figure 5A:
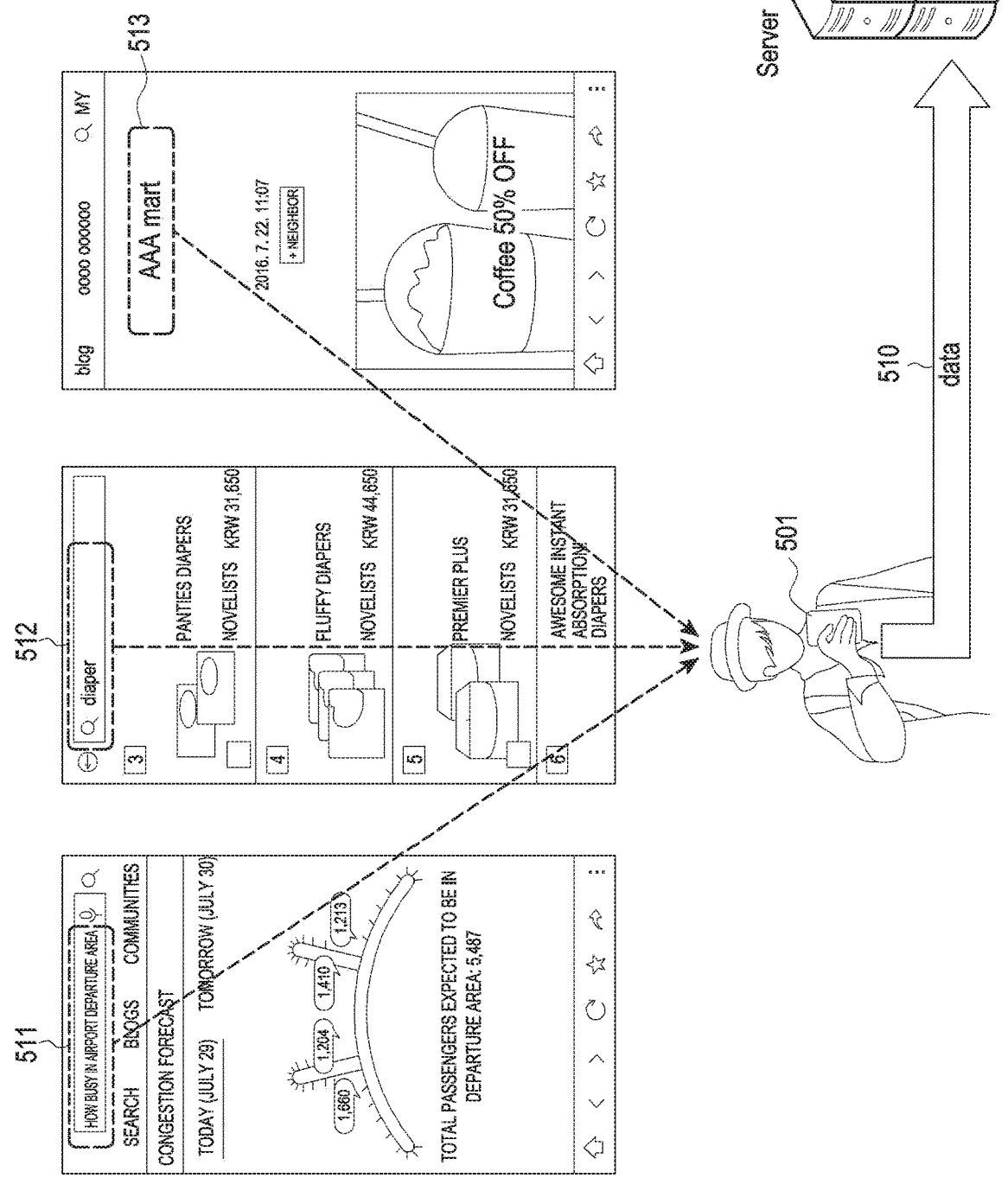
FIGS. 5A to 5C are views illustrating a method of providing proximity-based information according to various embodiments of the present invention.
Figure 5B:
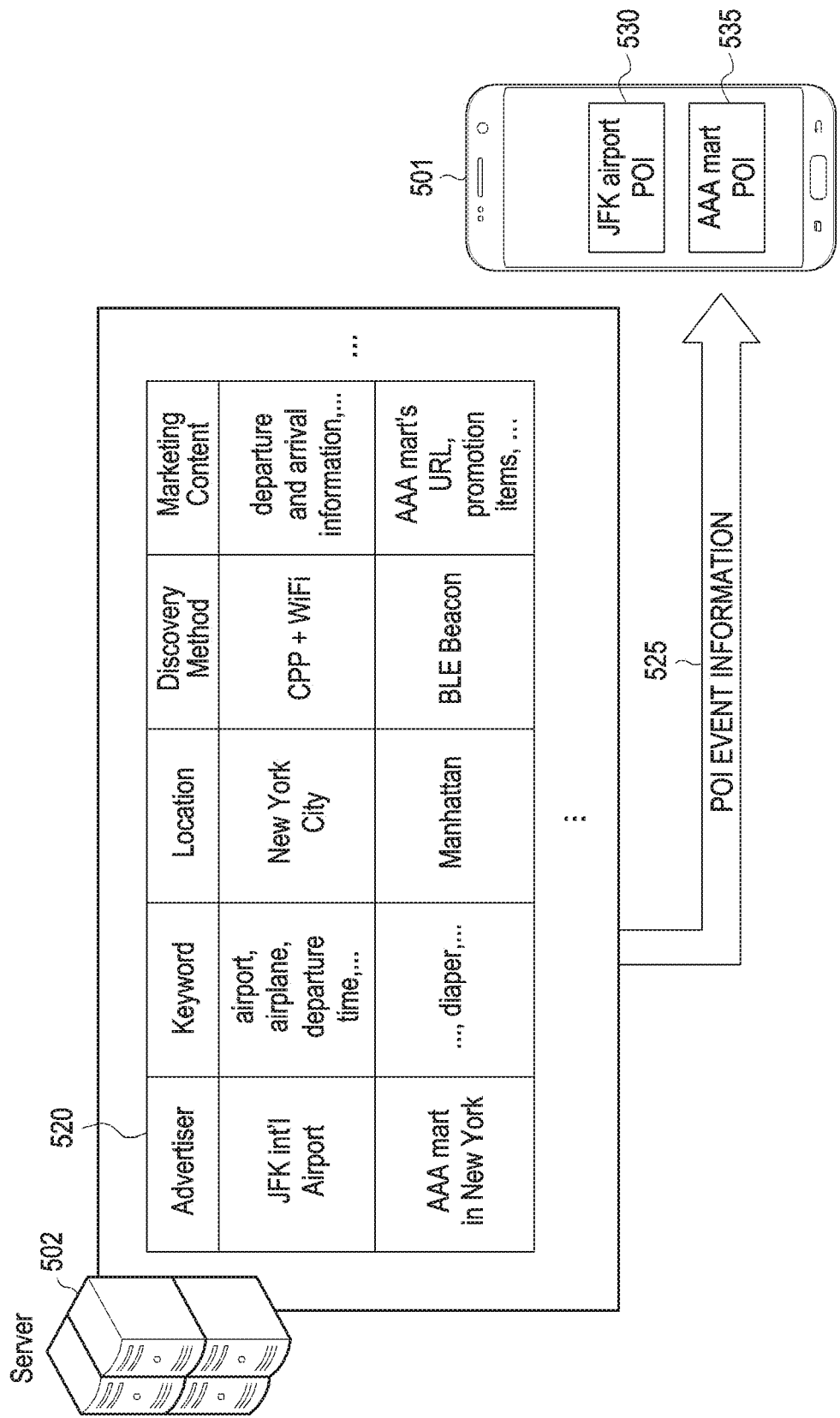
Figure 5C:
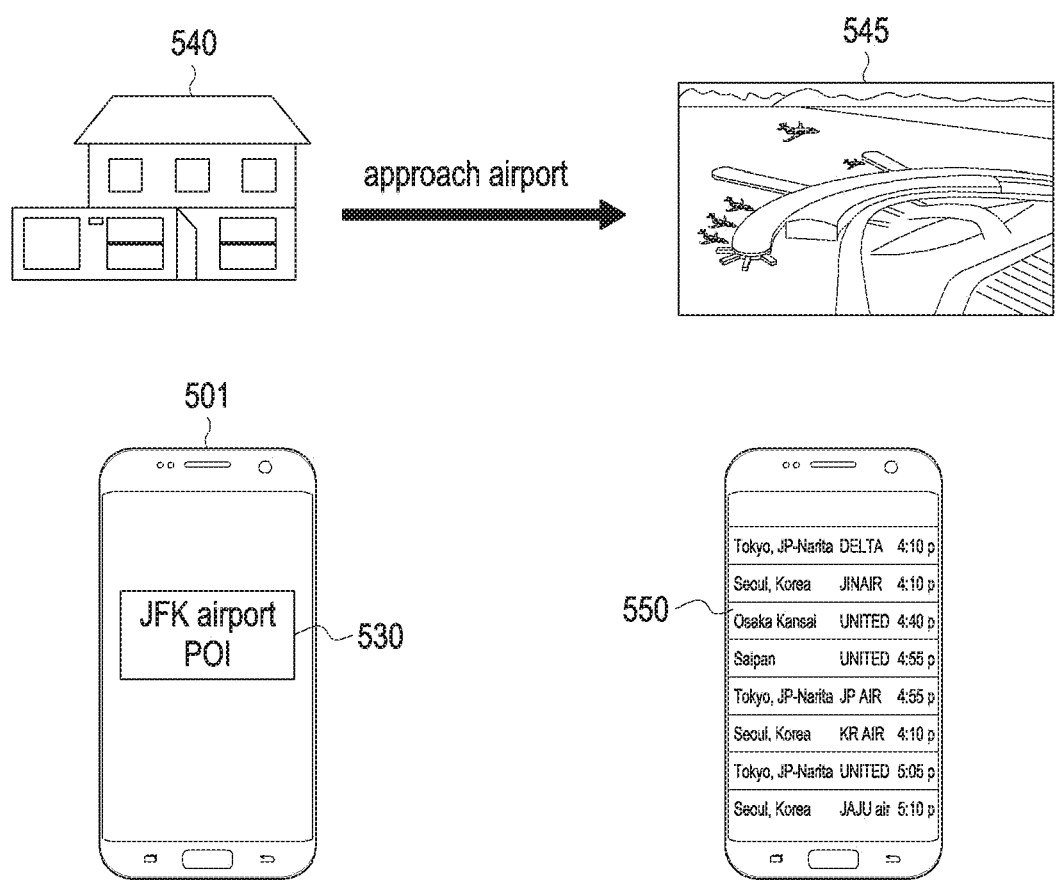

FIGS. 5A to 5C are views illustrating a method of providing proximity-based information according to various embodiments of the present invention.

Referring to FIG. 5A, a first electronic device 501 may obtain at least one piece of context information from one or more programs (e.g., 140) running on the first electronic device 501.

For example, in a case where a search application is executed on the first electronic device 501, the first electronic device 501 may obtain at least one keyword 511 received through an input device (e.g., 250) of the first electronic device 501, as context information.

In a case where a commerce application runs on the first electronic device 501, the first electronic device 501 may obtain at least one product name 512 identified from the commerce application, as context information.

In a case where a social media service application is executed on the first electronic device 501, the first electronic device 501 may obtain at least one trademark 513, as context information, identified through the social media service application.

The first electronic device 501 may transmit, to a server 502, data 510 including at least one piece of location information and at least one piece of context information obtained.

Referring to FIG. 5B, the server 502 may store at least one piece of point-of-interest (POI) information 520 in the memory of the server 502. The point-of-interest (POI) information 520 stored in the memory of the server 502 may include user (e.g., an advertiser) information about the point-of-interest (POI), a keyword related to the point-of-interest (POI), location information about the point-of-interest (POI), a point-of-interest (POI) discovery method, and content related to the point-of-interest (POI).

For example, the point-of-interest (POI) information related to the user (e.g., an advertiser) in "JFK int'l Airport" may include, e.g., "airport," "airplane," and "departure time" as keywords related to "JFK int'l Airport" and New York City as location information about "JFK int'l Airport". The point-of-interest (POI) related to the user (e.g., an advertiser) in "JFK int'l Airport" may include communication processor positioning (CPP) of identifying the location of the electronic device using ambient cellular base stations and a Wi-Fi positioning system (WPS) method of identifying the location of the electronic device using ambient Wi-Fi APs, as the method of discovering "JFK int'l Airport" and may include departure and arrival information as the content related to "JFK int'l Airport".

Further, point-of-interest (POI) information related to the user (e.g., an advertiser) of "AAA mart" may include diaper as a keyword related to "AAA mart" and Manhattan as location information about "AAA mart". The point-of-interest (POI) information related to the user (e.g., an advertiser) of "AAA mart" may include a method of using BLE beacon as a method of discovering "AAA mart" and AAA mart's URL or promotion items as content related to "AAA mart".

According to an embodiment, the server 502 may generate point-of-interest (POI) event information 525 corresponding to the data 510 received from the first electronic device 501 and transmit the point-of-interest (POI) event information to the first electronic device 501. Receiving at least one piece of point-of-interest (POI) event information 530 and 535 from the server 502, the first electronic device 501 may store the at least one piece of point-of-interest (POI) event information 530 and 535 in the memory of the first electronic device 501.

Referring to FIG. 5C, it may be identified that the location of the first electronic device 501 is changed from a first location 540 to a second location 545. For example, the first electronic device 501 storing event information 530 about "JFK Airport" may identify whether the first electronic device 501 and "JFK Airport" 545 are proximate to each other by the process of comparing, periodically or in real-time, the current location of the first electronic device 501 and the event information 530 about "JFK Airport".

If the first electronic device 501 is identified to be proximate to "JFK Airport" 545, the first electronic device 501 may provide the user with the content 550, which the user (e.g., an advertiser) in "JFK Airport" provides, using the event information 530 about "JFK Airport" stored in the memory of the first electronic device 501.

Figure 6:
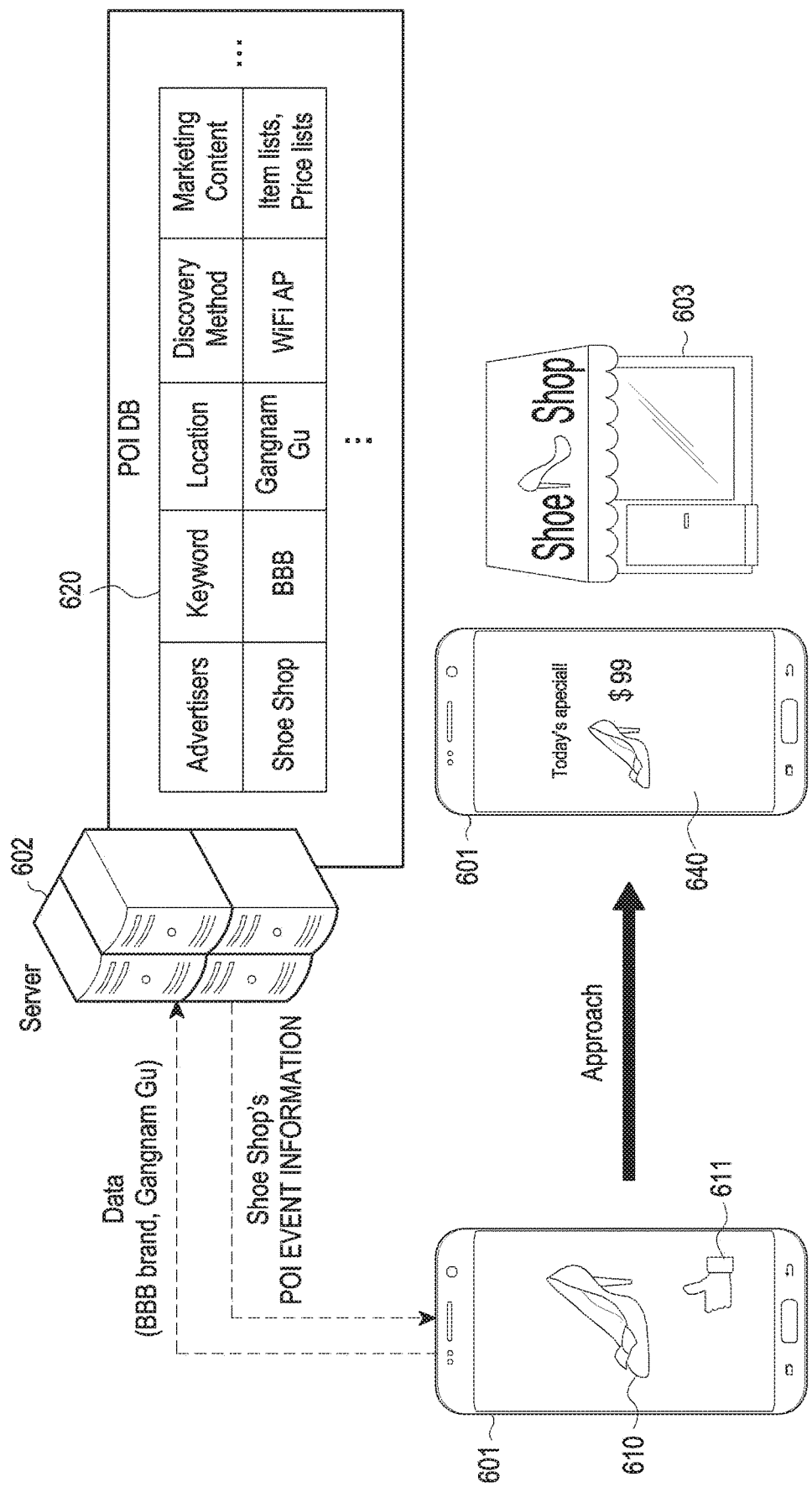
FIG. 6 is a view illustrating a method of providing proximity-based information according to various embodiments of the present invention.

FIG. 6 is a view illustrating a method of providing proximity-based information according to various embodiments of the present invention.

According to an embodiment, a first electronic device 601 may obtain context information from one or more programs (e.g., 140) running on the first electronic device 601. For example, the first electronic device 601 may obtain the user's favor input 611, as context information, obtained through a social media service application 610. Specifically, the user of the first electronic device 601 may show favor to BBB brand shoes provided through the social media service application 610. Meanwhile, assuming that the user of the first electronic device 601 is in Gangnam-gu when he or she shows favor to BBB brand shoes, the first electronic device 601 may obtain "BBB brand" as context information and may obtain "Gangnam-gu" as at least one piece of location information.

According to an embodiment, the first electronic device 601 may transmit "BBB brand" and "Gangnam-gu" as obtained to a server 602. Receiving at least one piece of data from the first electronic device 601, the server 602 may identify point-of-interest (POI) information 620 related to the received data among point-of-interest (POI) information stored in the memory of the server 602. For example, the point-of-interest (POI) information 620 related to the received data may be information about the user (e.g., an advertiser) using the brand name "Shoe Shop" 603. The user (e.g., an advertiser) of "Shoe Shop" 603, as a shoes seller having registered BBB as a point-of-interest (POI)-related keyword, may carry BBB brand.

According to an embodiment, the server 602 may generate event information about "Shoe Shop" 603 using the point-of-interest (POI) information related to the user (e.g., an advertiser) of "Shoe Shop" 603 and transmit the generated event information about "Shoe Shop" 603 to the first electronic device 601.

According to an embodiment, receiving the event information about "Shoe Shop" 603 from the server 602, the first electronic device 601 may identify the current location of the first electronic device 601 and the location of "Shoe Shop" 603 and identify whether the first electronic device 601 and "Shoe Shop" 603 are proximate to each other. In this case, the first electronic device 601 may identify whether it is proximate to "Shoe Shop" 603 using a method of discovering "Shoe Shop" 603 included in the event information about "Shoe Shop" 603. For example, the first electronic device 601 may identify whether it is proximate to "Shoe Shop" 603 based on whether Wi-Fi AP information is detected as proposed as the method of discovering "Shoe Shop" 603.

If the first electronic device 601 and "Shoe Shop" 603 are identified to be proximate to each other, the first electronic device 601 may display content (e.g., marketing content) 640 included in the event information about "Shoe Shop" 603 through the display of the first electronic device 601. According to an embodiment, the first electronic device 601 may output item lists or price lists as content.

Figure 7:
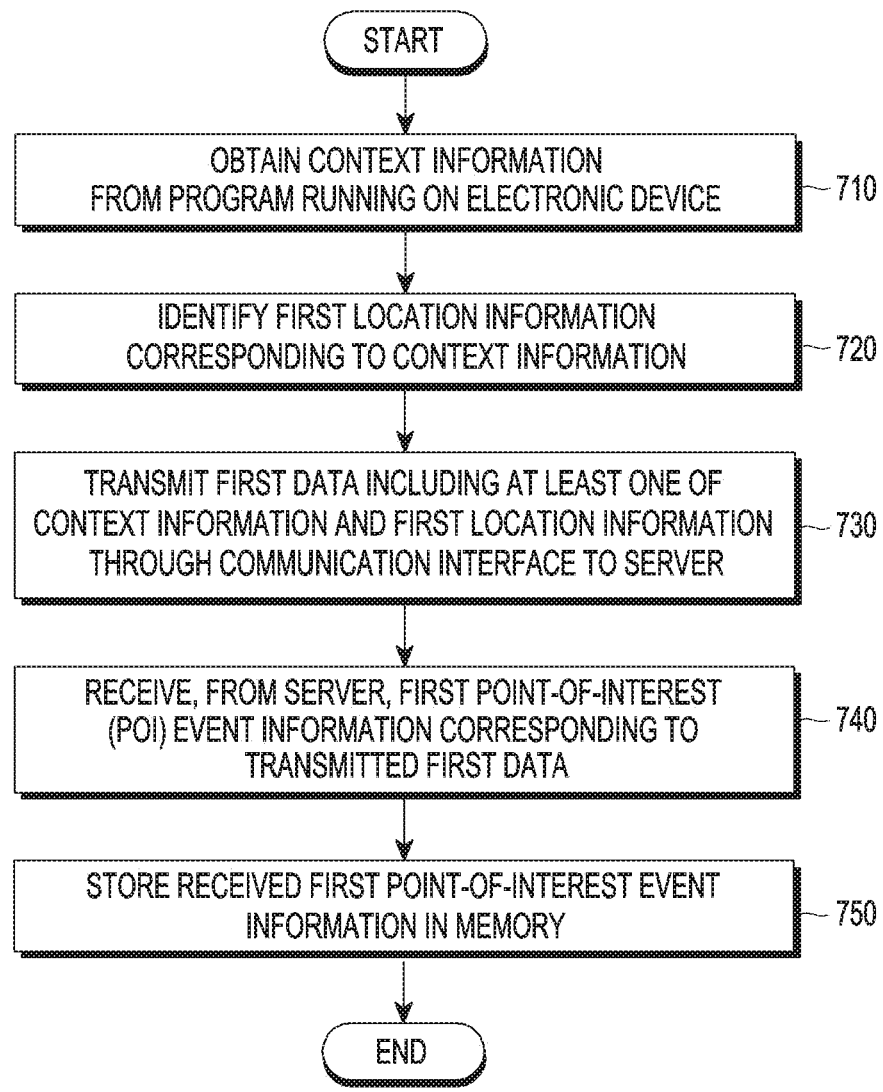
FIG. 7 is a flowchart illustrating a method of providing proximity-based information through an electronic device according to various embodiments of the present invention.

FIG. 7 is a flowchart illustrating a method of providing proximity-based information through an electronic device according to various embodiments of the present invention.

The entity of performing the method may be a processor of an electronic device (e.g., the electronic device 101 or 201) including a communication interface (e.g., the communication interface 170 or the communication module 220), a memory (e.g., the memory 130 or 230), and the processor (e.g., the processor 120 or 210).

Referring to FIG. 7, in operation 710, according to an embodiment, the processor may obtain at least one piece of context information from one or more programs executed on the electronic device. The one or more programs may be a program installed on the electronic device or running on the electronic device. The processor may obtain at least one piece of data generated while executing the one or more programs, as context information. The processor may obtain at least one piece of data, as context information, stored in the memory of the electronic device, in relation to the one or more programs.

According to an embodiment, the processor may use a preset condition in obtaining the context information from the one or more programs. For example, the processor may identify whether to obtain content, as context information, invoked through one or more programs, based on, e.g., the frequency of the content being invoked through one or more programs, time continuously used after invoked, or whether it has been set as a favorite page. If a first webpage is invoked a preset number of times through a web browser program, the first webpage is invoked and then output for a preset time or longer, or the first webpage is set as a favorite page, the processor may obtain the whole or part of the first webpage, as context information. If a first keyword is identified a preset number of times or a first item is clicked on a preset number of times while a commerce application or social media service application is running, the processor may obtain the first keyword or the first item as context information.

In operation 720, according to an embodiment, the processor may identify first location information corresponding to the context information. For example, the processor may identify that the current location of the electronic device when the context information is obtained is the first location information. The processor may identify at least one location corresponding to the context information, as the first location information. If the keyword "Eiffel Tower" as context information is obtained, the processor may identify the address of "Eiffel Tower" in Paris as first location information or the address of an "Eiffel Tower" restaurant in the city where the electronic device is located as first location information. According to an embodiment, the processor may use the context information in identifying at least one location corresponding to the context information as the first location information. For example, in a case where plenty of information related to Paris, France is among the pieces of context information obtained, the processor may identify the address of "Eiffel Tower" in Paris as the first location information. In a case where there is much information related to the restaurant and city where the electronic device is located among the pieces of information obtained, the processor may identify the address of the "Eiffel Tower" restaurant in the city where the electronic device is in, as the first location information.

In operation 730, according to an embodiment, the processor may transmit, to a server, first data including at least one of the first location information and the context information through a communication interface. According to an embodiment, the processor may transmit, periodically or in real-time, the first data to the server. The processor may transmit the first data to the server only when a preset condition is met. For example, in a case where a preset number of pieces of context information or first location information which are identical to each other are stored in the memory of the electronic device, the processor may transmit the first data to the server.

In operation 740, according to an embodiment, the processor may receive, from the server, first point-of-interest (POI) event information corresponding to the transmitted first data. The received first point-of-interest (POI) event information may include information about the user (e.g., an advertiser) related to at least one of the first location information and the context information included in the first data. For example, in a case where "Eiffel Tower" as context information is transmitted to the server, the received first point-of-interest (POI) event information may include information related to the user (e.g., an advertiser) of "Eiffel Tower" in Paris or information related to the user (e.g., an advertiser) of the restaurant "Eiffel Tower".

In operation 750, according to an embodiment, the processor may store the received first point-of-interest (POI) event information in the memory of the electronic device. The first point-of-interest (POI) event information stored in the memory of the electronic device may be used to identify whether the electronic device and the first point-of-interest (POI) are proximate to each other. Meanwhile, in a case where the first point-of-interest (POI) event information stored in the memory is used or is not used for a preset time, the first point-of-interest (POI) event information may be deleted from the memory of the electronic device.

Operations 710 to 750 are provided for the purposes of describing embodiments of the present invention, and operations 710 to 750 are not necessarily performed sequentially nor are all of the operations performed. For example, only some of the operations may be performed according to settings.

Figure 8:
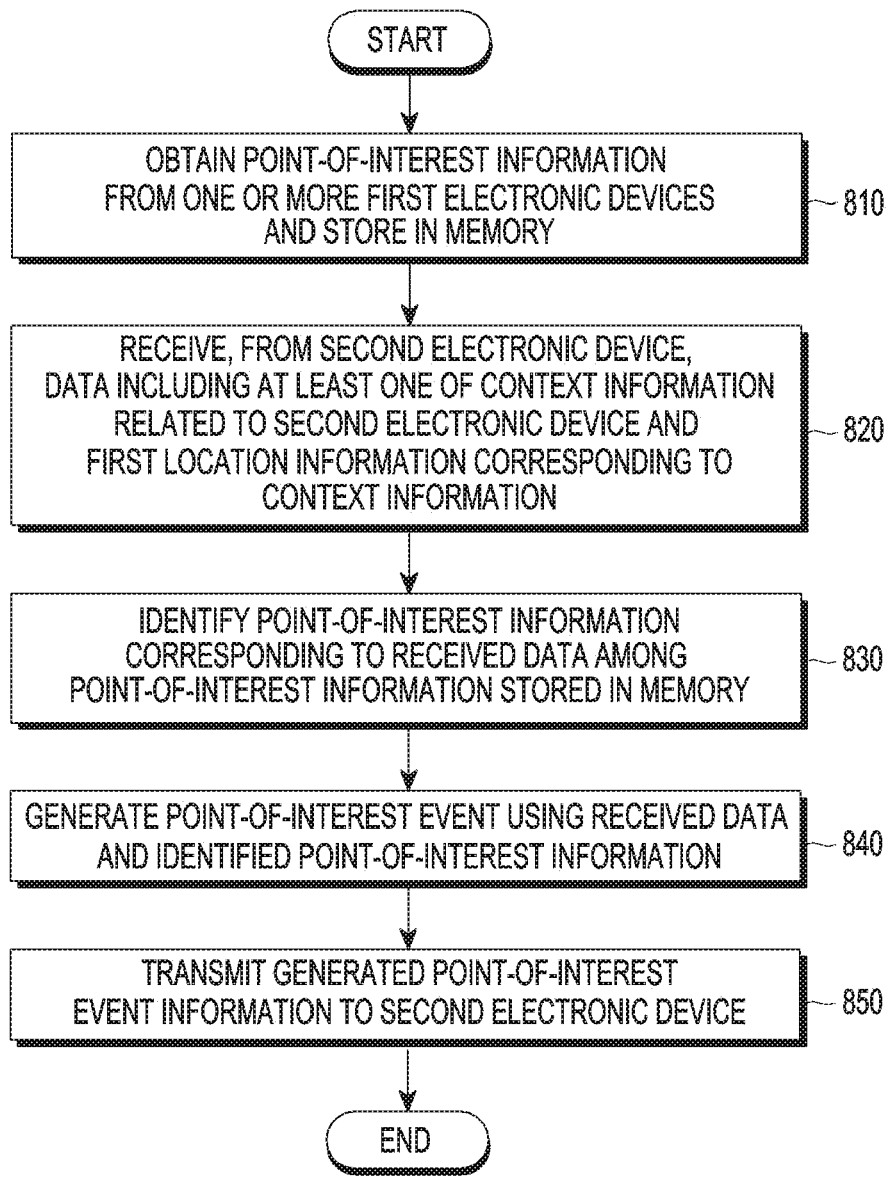
FIG. 8 is a flowchart illustrating a method of providing proximity-based information through a server according to various embodiments of the present invention.

FIG. 8 is a flowchart illustrating a method of providing proximity-based information through a server according to various embodiments of the present invention.

The entity of performing the method may be a processor of a server including a communication interface (e.g., the communication interface 170 or the communication module 220), a memory (e.g., the memory 130 or 230), and the processor (e.g., the processor 120 or 210).

Referring to FIG. 8, in operation 80, according to an embodiment, the processor of the server may obtain point-of-interest (POI) information from one or more first electronic devices and store the obtained point-of-interest (POI) information in the memory of the server. Here, the one or more first electronic devices may be the entity which provides point-of-interest (POI) information and may mean an electronic device which may access the server in response to a user (e.g., an advertiser)'s command and generate, register, and modify at least one piece of point-of-interest (POI) information.

In operation 820, according to an embodiment, the processor of the server may receive, from a second electronic device, data including at least one of context information related to the second electronic device and first location information corresponding to the context information.

In operation 830, according to an embodiment, the processor of the server may identify the point-of-interest (POI) corresponding to the received data among the pieces of point-of-interest (POI) information stored in the memory of the server. For example, the processor may identify the point-of-interest (POI) information related to the context information received from the second electronic device among the pieces of point-of-interest (POI) information stored in the memory of the processor. Or, the processor may identify the point-of-interest (POI) information related to the first location information received from the second electronic device among the pieces of point-of-interest (POI) information stored in the memory of the processor.

In operation 840, according to an embodiment, the processor of the server may generate point-of-interest (POI) event information using the received data and the identified point-of-interest (POI) information. Here, point-of-interest (POI) event information may mean information generated to provide customized information to the second electronic device. To that end, the processor may identify the information related to the data received from the second electronic device among the pieces of point-of-interest (POI) information stored in the memory of the server and generate the point-of-interest (POI) event information using the identified information. For example, the point-of-interest (POI) event information may include the whole or part of the point-of-interest (POI) information.

In operation 850, according to an embodiment, the processor of the server may transmit the generated point-of-interest (POI) event information to the second electronic device. The processor may generate a plurality of pieces of point-of-interest (POI) event information based on the received data and may transmit at least one of the plurality of pieces of point-of-interest (POI) event information generated to the second electronic device. According to another embodiment, the processor may transmit only some pieces of point-of-interest (POI) event information which have high priority among the plurality of pieces of point-of-interest (POI) event information generated to the second electronic device.

Operations 810 to 850 are provided for the purposes of describing embodiments of the present invention, and operations 810 to 850 are not necessarily performed sequentially nor are all of the operations performed. For example, only some of the operations may be performed according to settings.

Figure 9:
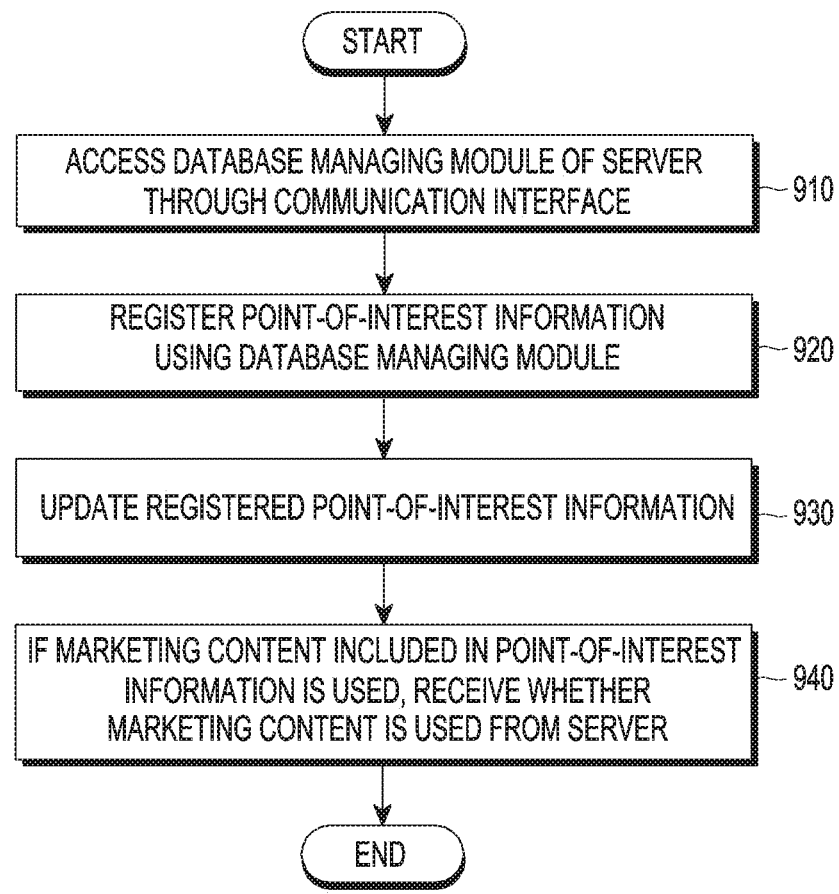
FIG. 9 is a flowchart illustrating a method of registering proximity-based information in a server using an electronic device according to various embodiments of the present invention.

FIG. 9 is a flowchart illustrating a method of registering proximity-based information in a server using an electronic device according to various embodiments of the present invention.

The entity of performing the method may be a processor of an electronic device (e.g., the electronic device 101 or 201) including a communication interface (e.g., the communication interface 170 or the communication module 220), a memory (e.g., the memory 130 or 230), and the processor (e.g., the processor 120 or 210).

Referring to FIG. 9, in operation 910, according to an embodiment, the processor may access a database managing module of a server through the communication interface. For example, the processor may access at least one server in response to a user (e.g., an advertiser)'s command. According to an embodiment, at least one server may be configured to permit access of only pre-registered electronic devices. In this case, the processor may be the processor included in an electronic device pre-registered in the at least one server.

In operation 920, according to an embodiment, the processor may register point-of-interest (POI) information in the server using the database managing module of the server. To register point-of-interest (POI) information related to the user (e.g., an advertiser) in the server, the processor may access the database managing module of the server and generate at least one piece of point-of-interest (POI) information through the database managing module. Here, the database managing module may mean a program that the user (e.g., an advertiser) may use to manage the point-of-interest (POI), such as generating or modifying point-of-interest (POI) information.

In operation 930, according to an embodiment, the processor may update the registered point-of-interest (POI) information. The present invention may update the point-of-interest (POI) information registered in the server based on at least one input or data received through the electronic device. The operation of updating the point-of-interest (POI) information registered in the server may be performed periodically as preset.

In operation 940, according to an embodiment, in a case where content included in the point-of-interest (POI) information is used, the processor may receive whether the content is used or not from the server. For example, in a case where the content included in the point-of-interest (POI) information is identified to have been used, the server may provide the relevant information to the electronic device. The processor may provide the user with information related to use of the content by outputting the received information in a preset form.

Operations 910 to 940 are provided for the purposes of describing embodiments of the present invention, and operations 910 to 940 are not necessarily performed sequentially nor are all of the operations performed. For example, only some of the operations may be performed according to settings.

Figure 10:
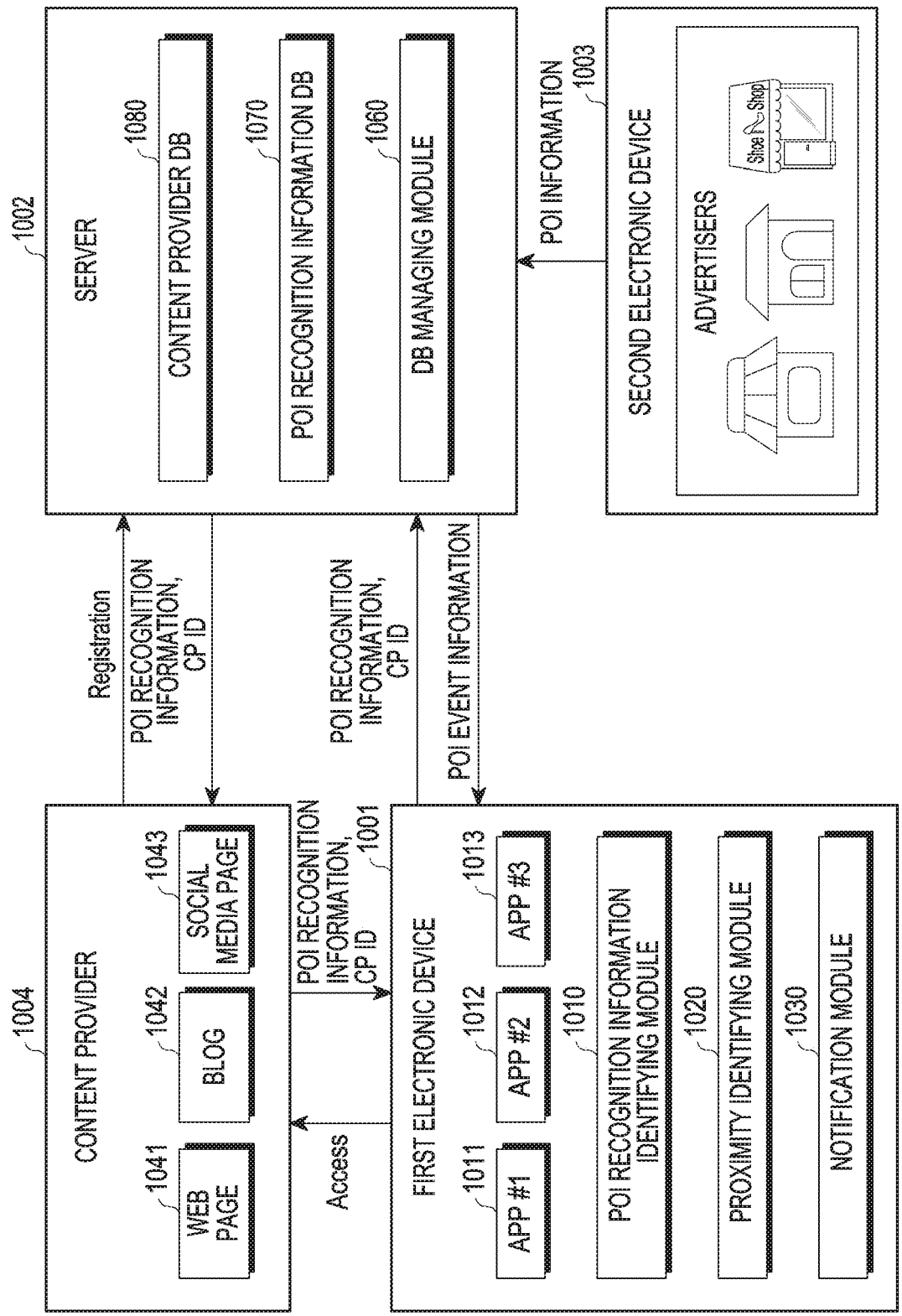
FIG. 10 is a block diagram illustrating components included in electronic devices and the relationship between the components according to various embodiments of the present invention.

FIG. 10 is a block diagram illustrating components included in electronic devices and the relationship between the components according to various embodiments of the present invention. Referring to FIG. 10, according to an embodiment of the present invention, a system may include a first electronic device 1001, at least one server 1002, a second electronic device 1003, and at least one content provider device 1004.

According to an embodiment, the second electronic device 1003, as a terminal device (e.g., smartphone, tablet, laptop PC, or desktop PC), may transmit and receive data to/from the server 402 through various communication interfaces (e.g., 170). The second electronic device 1003 may register point-of-interest (POI) information in the server 1002 in response to a user (e.g., an advertiser)'s command.

According to an embodiment, at least one server 1002 may include a DB managing module 1060 capable of managing point-of-interest (POI) information received from the second electronic device 1003. The DB managing module 1060 may generate various forms of point-of-interest (POI) recognition information corresponding to the point-of-interest (POI) based on the point-of-interest (POI) information received from the second electronic device 1003. Here, the point-of-interest (POI) recognition information may be a kind of identifier and may be included and provided in part of content for advertising the point-of-interest (POI). The point-of-interest (POI) recognition information may be used to identify, e.g., who posted the point-of-interest (POI)-advertising content, how frequent the content has been exposed, and to whom the content has been exposed. The point-of-interest (POI) recognition information generated by the DB managing module 1060 may be stored in a point-of-interest (POI) recognition information DB 1070 of the server 1002. Meanwhile, a content provider DB 1080 of the server 1002 may store information about the content provider advertising the point-of-interest (POI) by disclosing point-of-interest (POI)-related information in various forms. For example, the content provider DB 1080 may store content provider (CP) IDs per content provider.

According to an embodiment, the content provider device 1004, as a terminal device (e.g., smartphone, tablet, laptop PC, or desktop PC), may transmit and receive data to/from the server 402 through various communication interfaces (e.g., 170). The content provider device 1004 may access the server 1002 and register content provider-related information. The content provider device 1004 may obtain the CP ID from the server 1002, corresponding to the registration. Here, the CP ID may be at least one identifier capable of identifying the content provider device 1004 and may be generated by the server 1002 when the content provider device 1004 first accesses the server 1002.

According to an embodiment, the content provider device 1004 may post the point-of-interest (POI)-related information in various spaces, e.g., a webpage 1041, a blog 1042, or a social media service homepage 1043, over the network, in response to the content provider's command. Meanwhile, the content provider device 1004 may receive, from the server 1002, the point-of-interest (POI)-related information which is to be posted to the webpage 1041, blog 1042, or social media service homepage 1042. At this time, the content provider device 1004 may additionally receive the point-of-interest (POI) recognition information and the CP ID and may post the point-of-interest (POI) recognition information and the CP ID along with the point-of-interest (POI)-related information in various spaces over the network.

According to an embodiment, the first electronic device 1001 may mean an electronic device which may communicate data with the server 1002 via a short-range wireless communication interface, such as WLAN, or a wireless cellular interface, such as 3GPP or LTE, as a mobile electronic device, such as smartphone, tablet, or laptop PC.

According to an embodiment, the first electronic device 1001 may include a point-of-interest (POI) recognition information identifying module 1010 capable of identifying the point-of-interest (POI) recognition information from one or more programs 1011, 1012, and 1013 installed on the first electronic device 1001 or running on the first electronic device 1001. The point-of-interest (POI) recognition information may be identified through the point-of-interest (POI) recognition information identifying module 1010 and be used as a condition for measuring the level of interest in the point-of-interest (POI) of the user of the first electronic device 1001 or providing the point-of-interest (POI)-related content to the user of the first electronic device 1001. The point-of-interest (POI) recognition information may be provided when the first electronic device 1001 accesses the webpage 1041, blog 1042, or social media service homepage 1043 posting the point-of-interest (POI)-related information. According to an embodiment, the point-of-interest (POI) recognition information may be provided in an HTML, code, QR code, or various program source codes and may be identified by the point-of-interest (POI) recognition information identifying module 1010.

According to an embodiment, in a case where the point-of-interest (POI) recognition information is identified by one or more programs 1011, 1012, and 1013, the point-of-interest (POI) recognition information identifying module 1010 of the first electronic device 1001 may obtain the identified point-of-interest (POI) recognition information and the CP ID of the content provider device 1004 which has provided the identified point-of-interest (POI) recognition information. For example, in a case where first point-of-interest (POI) recognition information is identified in the webpage 1041 generated by a first content provider device, the point-of-interest (POI) recognition information identifying module 1010 may obtain a first point-of-interest (POI) recognition information and a first CP ID of a first content provider. In a case where the first point-of-interest (POI) recognition information is identified in the blog 1042 generated by a second content provider device, the point-of-interest (POI) recognition information identifying module 1010 may obtain the first point-of-interest (POI) recognition information and a second CP ID of a second content provider. In a case where the first point-of-interest (POI) recognition information is identified in the social media service homepage 1043 generated by a third content provider device, the point-of-interest (POI) recognition information identifying module 1010 may obtain the first point-of-interest (POI) recognition information and a third CP ID of a third content provider.

According to an embodiment, in a case where particular point-of-interest (POI) recognition information is identified a preset number of times within a preset time, the first electronic device 1001 may obtain point-of-interest (POI) event information about a particular point-of-interest (POI) from the server 1002. For example, in a case where the first point-of-interest (POI) recognition information is identified a preset number of times within a preset time, the first electronic device 1001 may transmit the first point-of-interest (POI) recognition information to the server 1002 and may obtain, from the server 1002, the first point-of-interest (POI) event information corresponding thereto. Meanwhile, the first electronic device 1001 may transmit, to the server 1002, the CP ID of the content provider, who has provided the first point-of-interest (POI) recognition information, together with the first point-of-interest (POI) recognition information. According to the above embodiment, the first electronic device 1001 may transmit a first CP ID, a second CP ID, and a third CP ID along with the first point-of-interest (POI) recognition information.

According to an embodiment, receiving at least one CP ID from the first electronic device 1001, the server 1002 may identify the proportion of contribution to advertisement per content provider device based on the received CP ID. For example, in a case where the first CP ID is received five times, the second CP ID is received three times, and the third CP ID is received two times, the server 1002 may identify that the proportion of contribution of the first content provider device, the proportion of contribution of the second content provider device, and the proportion of contribution of the third content provider device are 50%, 30%, and 20%, respectively, as the proportions of contribution to advertisement of the content corresponding to the first point-of-interest (POI) recognition information. The operator of the server 1002 may receive an advertisement handling fee from the user (e.g., an advertiser) of the second electronic device 1003 and provide an advertisement fee to the operator of the content provider device 1004 based on the calculated proportion of contribution.

According to an embodiment, receiving the point-of-interest (POI) event information from the server 1002, the first electronic device 1001 may store the received point-of-interest (POI) event information in the memory of the first electronic device 1001. According to an embodiment, the proximity identifying module 1020 of the first electronic device 1001 may identify whether the first electronic device 1001 and the point-of-interest (POI) are proximate to each other using the current location of the first electronic device 1001 and the point-of-interest (POI) event information stored in the memory. If the first electronic device 1001 and the point-of-interest (POI) are identified to be proximate to each other, the proximity identifying module 1020 may transfer a result of the proximity identification to the notification module 1030. Upon identifying that the first electronic device 1001 and the point-of-interest (POI) are proximate to each other, the notification module 1030 of the first electronic device 1001 may output content included in the point-of-interest (POI) event information.

Figure 11A:
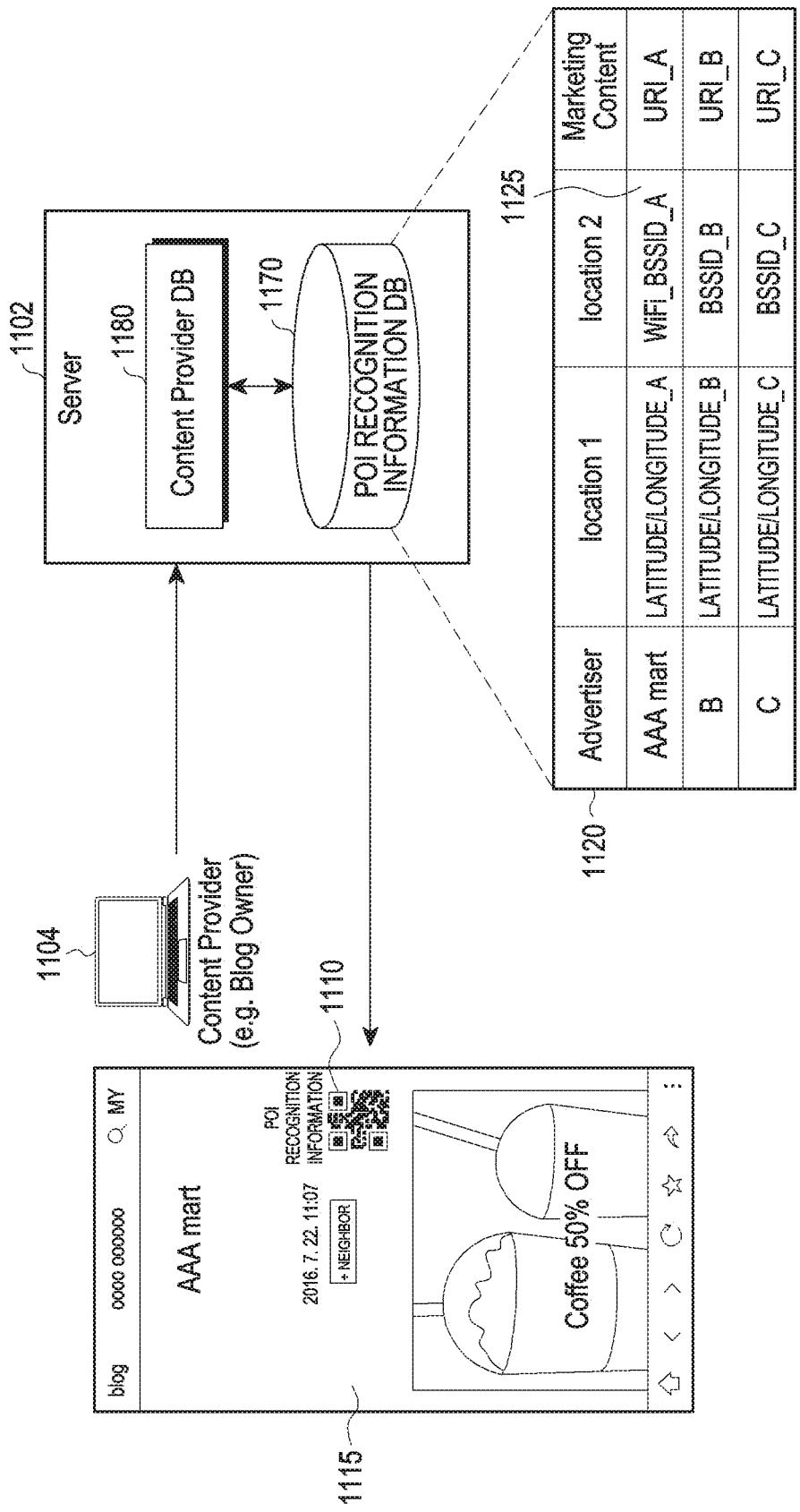
FIGS. 11A to 11C are views illustrating a method of providing proximity-based information using content according to various embodiments of the present invention.
Figure 11B:
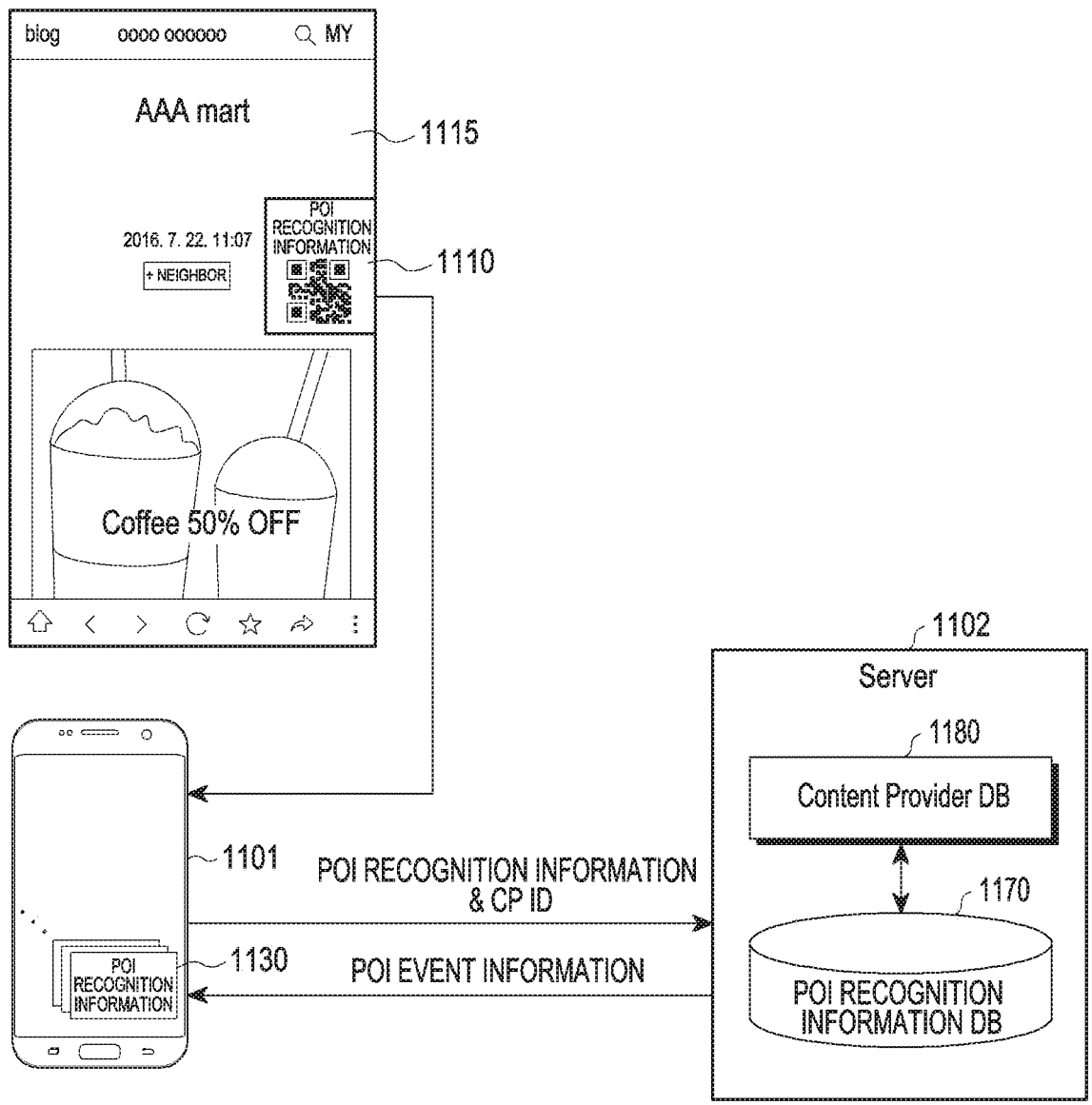
Figure 11C:
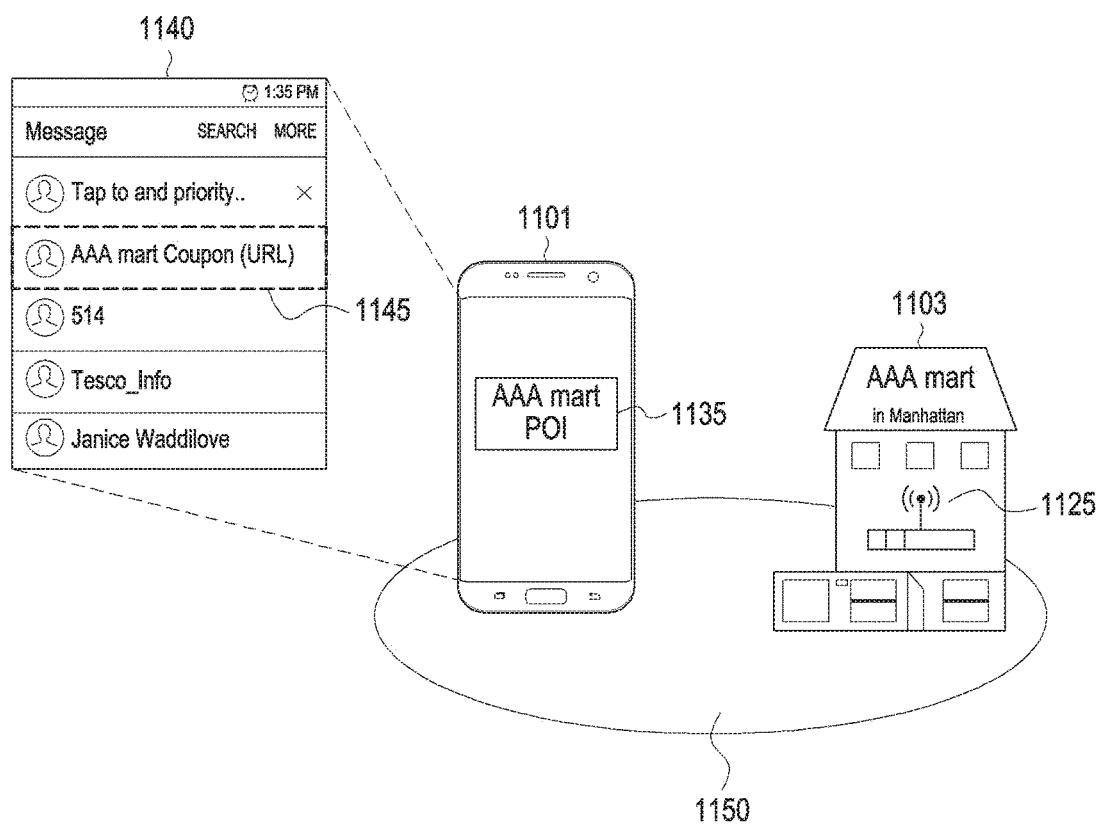

FIGS. 11A to 11C are views illustrating a method of providing proximity-based information using content according to various embodiments of the present invention.

Referring to FIG. 11A, a content provider device 1104 may access at least one server 1102 in response to a content provider's command. The content provider device 1104 may register information about the content provider in the server 1102 and, corresponding thereto, obtain a content provider ID (hereinafter, CP ID) from the server 1102. Meanwhile, the content provider information registered in the server 1102 may be stored in a content provider DB 1180 of the server 1102.

According to an embodiment, the server 1102 may obtain point-of-interest (POI) information from the user (e.g., an advertiser) of the point-of-interest (POI). Further, the server 1102 may generate various forms of point-of-interest (POI) recognition information corresponding to the point-of-interest (POI) using the obtained point-of-interest (POI) information. The generated point-of-interest (POI) recognition information may be stored in a point-of-interest (POI) recognition information DB 1170 of the server 1102. The point-of-interest (POI) recognition information DB 1170 may store point-of-interest (POI) event information 1120 including, e.g., content related to the point-of-interest (POI), the location of the point-of-interest (POI), and the user (e.g., an advertiser) of the point-of-interest (POI). For example, the point-of-interest (POI) recognition information DB 1170 may store the latitude/longitude indicating the address of AAA mart, WiFi_BSSID_A, which is information about a Wi-Fi AP 1125 available upon discovering AAA mart, and URI_A, as content related to AAA mart.

According to an embodiment, the controller device 1104 may obtain at least one piece of information related to the point-of-interest (POI) from the server 1102. The content provider device 1104 may post at least one piece of information related to the point-of-interest (POI) in various spaces, e.g., a webpage, a blog, or a social media service homepage, over the network. For example, the content provider device 1104 may post the information related to AAA mart, as obtained from the server 1102, through the blog 1115 and post the point-of-interest (POI) recognition information 1110 obtained from the server 1102 through the blog 1115. Meanwhile, at least one electronic device accessing the blog 1115 may obtain point-of-interest (POI) recognition information posted on the blog 1115. The content provider device 1104 may be configured to automatically transmit the point-of-interest (POI) recognition information to the electronic device which has connected to the blog 1115.

According to an embodiment, the point-of-interest (POI) recognition information may be provided in an HTML code, QR code, or various program source codes. For example, the point-of-interest (POI) recognition information provided in HTML code may be included in part of HTML code constituting the blog. The point-of-interest (POI) recognition information 1110 may visually be displayed along with at least one piece of information related to the point-of-interest (POI). However, in a case where the point-of-interest (POI) recognition information 1110 is provided in HTML code, it may not be displayed visually.

Referring to FIG. 11B, the first electronic device 1101 may access the blog 1115 generated by the content provider device 1104 through at least one program installed on the first electronic device 1101. For example, the first electronic device 1101 may search for AAA mart using a search application and, in response to the user's command, access the blog 1115 generated by the content provider device 1104 among the results of search.

According to an embodiment, the blog 1115 generated by the content provider device 1104 may post information related to AAA mart. The first electronic device 1101 may obtain point-of-interest (POI) recognition information 1110 included in the blog 1115 while simultaneously displaying the AAA mart-related information posted on the blog 1115 through the display of the first electronic device 1101. The first electronic device 1101 may store the obtained point-of-interest (POI) recognition information 1110 in the memory of the first electronic device 1101. Meanwhile, the first electronic device 1101 may obtain the CP ID of the content provider, who has provided the point-of-interest (POI) recognition information 1110, along with the point-of-interest (POI) recognition information 1110.

According to an embodiment, in a case where the number of pieces of point-of-interest (POI) recognition information 1130 stored in the memory exceeds a preset number, the first electronic device 1101 may transmit the point-of-interest (POI) recognition information 1130 stored in the memory to the server 1102. In this case, the first electronic device 1101 may transmit together the CP ID of the content provider who has provided the point-of-interest (POI) recognition information 1130. In a case where the first electronic device 1101 obtains the point-of-interest (POI) recognition information 1130 from the plurality of content providers, the number of CP IDs transmitted to the server 1102 may be one or more.

Receiving the point-of-interest (POI) recognition information 1130 and at least one CP ID from the first electronic device 1101, the server 1102 may generate point-of-interest (POI) event information and transmit the point-of-interest (POI) event information to the first electronic device 1101.

Referring to FIG. 11C, the first electronic device 1101 may store the point-of-interest (POI) event information 1135 received from the server 1102 in the memory of the first electronic device 1101. The received point-of-interest (POI) event information 1135 may include at least one of location information about the point-of-interest (POI), a discovery method of the point-of-interest (POI), content related to the point-of-interest (POI), and a recommendation index for the point-of-interest (POI). For example, according to the above embodiment, the memory of the first electronic device 1101 may store location information about AAA mart 1103, a discovery method of AAA mart 1103, and content related to AAA mart 1103.

According to an embodiment, the first electronic device 1101 may identify whether the first electronic device 1101 and AAA mart 1103 are proximate to each other using the discovery method of AAA mart 1103 stored in the memory of the first electronic device 1101. For example, in a case where a method of using information about a Wi-Fi AP 1125 installed in AAA mart 1103 is proposed as the method of discovering AAA mart 1103, the first electronic device 1101 may identify whether information about the Wi-Fi AP 1125 is detected from around the first electronic device 1101. If the first electronic device 1101 enters an area 1150 where the information about the Wi-Fi AP 1125 may be detected and WiFi_BSSID_A, which is the information about the Wi-Fi AP 1125, is identified by the first electronic device 1101, the first electronic device 1101 may identify that the first electronic device 1101 and AAA mart 1103 are proximate to each other.

According to an embodiment, if identified to be proximate to AAA mart 1103, the first electronic device 1101 may output the content related to AAA mart 1103, which is stored in the memory of the first electronic device 1101, through at least one component of the first electronic device 1101. For example, a coupon 1145 of AAA mart 1103, as the content related to AAA mart 1103, may be output through an SMS application 1140 of the first electronic device 1101.

Figure 12:
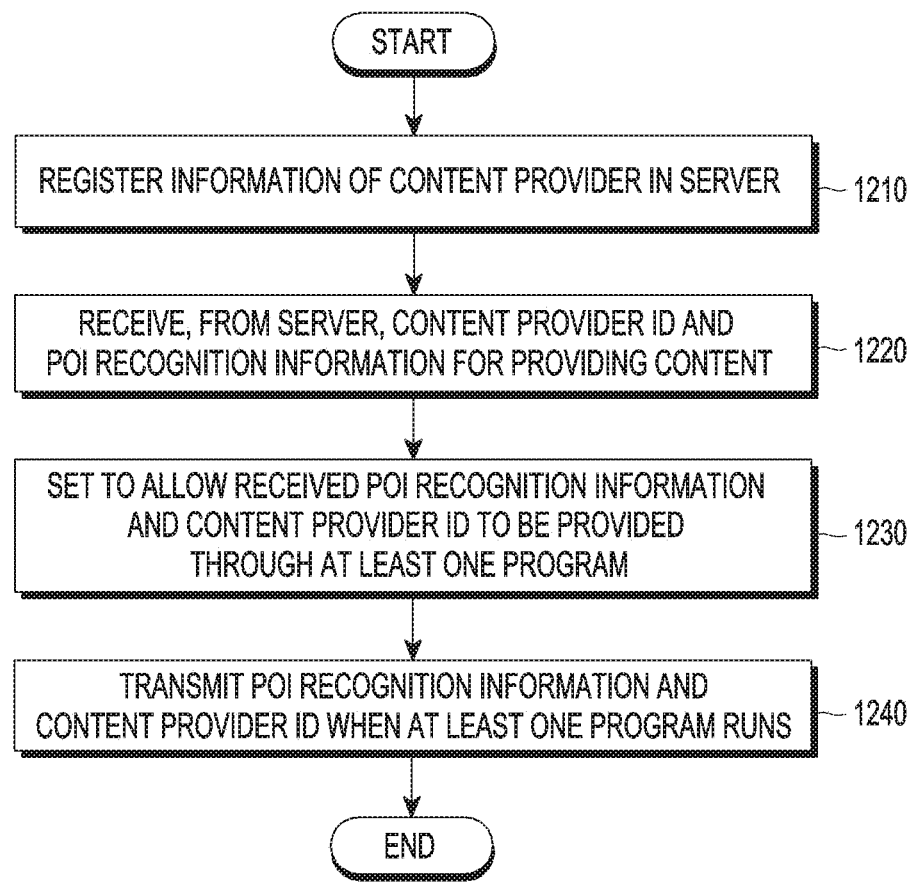
FIG. 12 is a flowchart illustrating a method of generating and providing content available for proximity-based marketing according to various embodiments of the present invention.

FIG. 12 is a flowchart illustrating a method of generating and providing content available for proximity-based marketing according to various embodiments of the present invention.

The entity of performing the method may be a processor of an electronic device (e.g., the electronic device 101 or 201) including a communication interface (e.g., the communication interface 170 or the communication module 220), a memory (e.g., the memory 130 or 230), and the processor (e.g., the processor 120 or 210). Here, electronic device may mean a content provider device (e.g., 1004).

Referring to FIG. 12, in operation 1210, according to an embodiment, the processor may register content provider information in a server. The electronic device may access at least one server in response to the content provider's command and transmit at least one of the pieces of content provider information according to a procedure as requested by the server.

In operation 1220, according to an embodiment, the processor may receive a content provider ID and point-of-interest (POI) recognition information for providing content from the server. For example, if the content provider information is registered in the server, the server may generate the content provider ID corresponding to the content provider and transmit the content provider ID to the electronic device. The point-of-interest (POI) recognition information may be a kind of identifier and may be included and provided in part of content for advertising the point-of-interest (POI). The point-of-interest (POI) recognition information may be used to identify, e.g., who posted the point-of-interest (POI)-advertising content, how frequent the content has been exposed, and to whom the content has been exposed.

In operation 1230, according to an embodiment, the processor may be configured to allow the received point-of-interest (POI) recognition information and content provider ID to be provided through at least one program. For example, upon posting the point-of-interest (POI)-related information received from the server in at least one network space, the processor may be configured to allow the received point-of-interest (POI) recognition information and content provider ID to be provided along with the posted information. For example, the processor may be configured to include the point-of-interest (POI) recognition information provided in an HTML code form, in HTML code constituting the webpage and, when the webpage is invoked, allow the point-of-interest (POI) recognition information to be provided together.

In operation 1240, according to an embodiment, the processor may transmit point-of-interest (POI) recognition information and content provider ID when at least one program is executed. For example, in a case where at least one program configured to provide point-of-interest (POI) recognition information and content provider ID is invoked by an external electronic device, the processor may transmit the point-of-interest (POI) recognition information and content provider ID to the external electronic device.

Operations 1210 to 1240 are provided for the purposes of describing embodiments of the present invention, and operations 1210 to 1240 are not necessarily performed sequentially nor are all of the operations performed. For example, only some of the operations may be performed according to settings.

Figure 13:
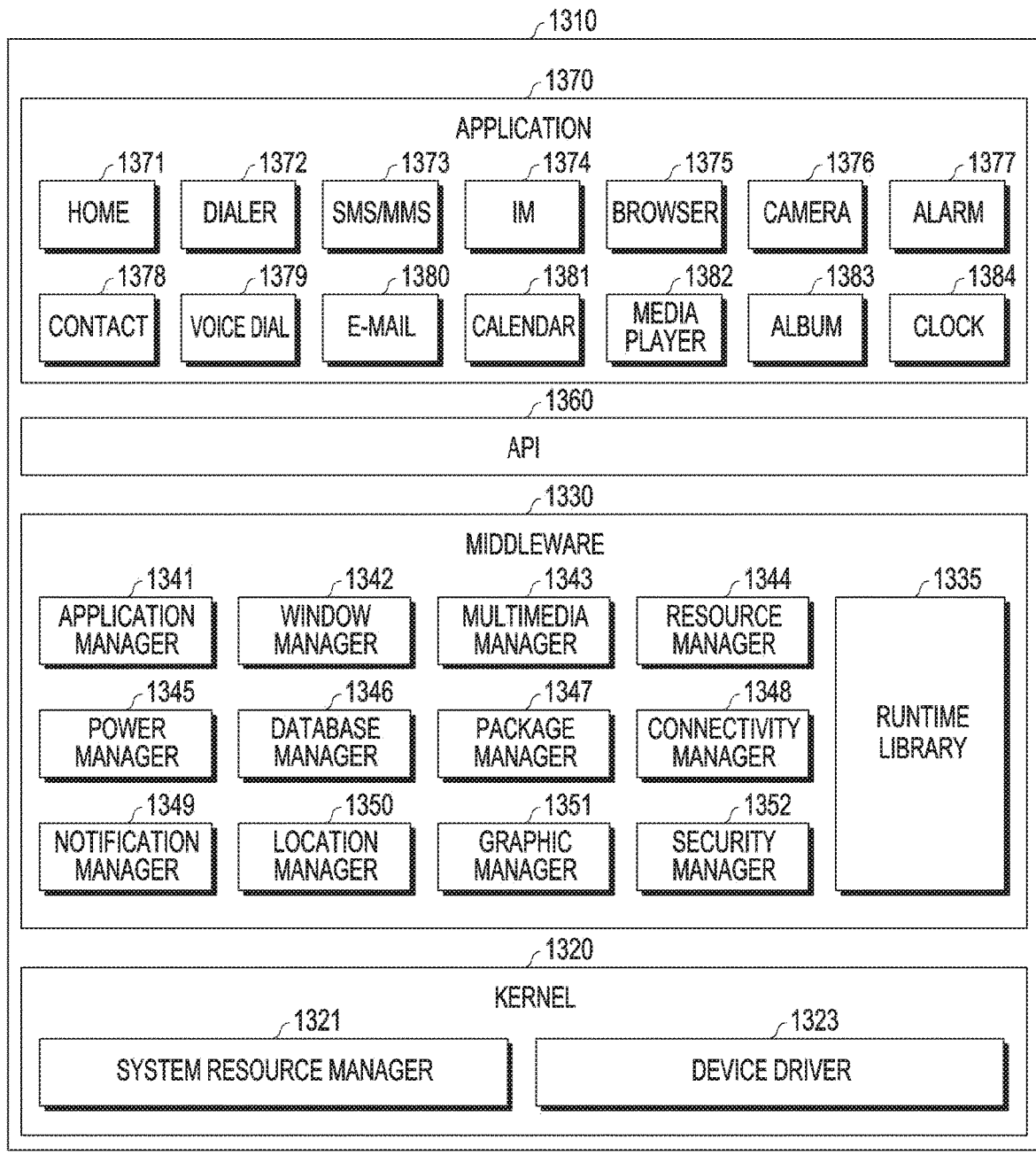
FIG. 13 is a block diagram illustrating a program module according to various embodiments of the present invention.

FIG. 13 is a block diagram illustrating a program module according to various embodiments of the present invention. According to an embodiment of the present disclosure, the program module 1310 (e.g., the program 140) may include an operating system (OS) controlling resources related to the electronic device (e.g., the electronic device 101) and/or various applications (e.g., the application processor 147) driven on the operating system. The operating system may include, e.g., Android™ iOS™, Windows™, Symbian™, Tizen™, or Bada™.

Referring to FIG. 13, the program module 1310 may include a kernel 1320 (e.g., the kernel 141), middleware 1330 (e.g., the middleware 143), an API 1360 (e.g., the API 145), and/or an application 1370 (e.g., the application program 147). At least a part of the program module 1310 may be preloaded on the electronic device or may be downloaded from an external electronic device (e.g., the electronic devices 102 and 104 or server 106).

The kernel 1320 may include, e.g., a system resource manager 1321 or a device driver 1323. The system resource manager 1321 may perform control, allocation, or recovery of system resources. According to an embodiment of the present disclosure, the system resource manager 1321 may include a process managing unit, a memory managing unit, or a file system managing unit. The device driver 1323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 1330 may provide various functions to the application 1370 through the API 1360 so that the application 1370 may use limited system resources in the electronic device or provide functions jointly required by applications 1370. According to an embodiment of the present invention, the middleware 1330 may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include a library module used by a compiler in order to add a new function through a programming language while, e.g., the application 1370 is being executed. The runtime library 1335 may perform input/output management, memory management, or arithmetic function processing.

The application manager 1341, for example, may manage the life cycle of the application 1370. The window manager 1342 may manage GUI resources used on the screen. The multimedia manager 1343 may grasp formats necessary to play media files and use a codec appropriate for a format to perform encoding or decoding on media files. The resource manager 1344 may manage the source code or memory space of the application 1370. The power manager 1345 may manage, e.g., the capacity, temperature, or power of the battery and identify and provide power information necessary for the operation of the electronic device using a corresponding piece of information of such. According to an embodiment of the present invention, the power manager 1345 may interwork with a basic input/output system (BIOS). The database manager 1346 may generate, search, or vary a database to be used in the applications 1370. The package manager 1347 may manage installation or update of an application that is distributed in the form of a package file. The connectivity manager 1348 may manage, e.g., wireless connectivity. The notification manager 1349 may provide an event, e.g., arrival message, appointment, or proximity alert, to the user. The location manager 1350 may manage, e.g., locational information on the electronic device. The graphic manager 1351 may manage, e.g., graphic effects to be offered to the user and their related user interface. The security manager 1352, for example, may provide system security or user authentication. According to an embodiment of the present invention, the middleware 1330 may include a telephony manager for managing the voice or video call function of the electronic device or a middleware module able to form a combination of the functions of the above-described elements. According to an embodiment of the present invention, the middleware 1330 may provide a module specified according to the type of the operating system. The middleware 1330 may dynamically omit some existing components or add new components.

The API 1360 may be a set of, e.g., API programming functions and may have different configurations depending on operating systems. For example, in the case of Android or iOS, one API set may be provided per platform, and in the case of Tizen, two or more API sets may be offered per platform.

The application 1370 may include an application that may provide, e.g., a home 1371, a dialer 1372, an SMS/MMS 1373, an instant message (IM) 1374, a browser 1375, a camera 1376, an alarm 1377, a contact 1378, a voice dial 1379, an email 1380, a calendar 1381, a media player 1382, an album 1383, or a clock 1384, health-care (e.g., measuring the degree of workout or blood sugar), or provision of environmental information (e.g., provision of air pressure, moisture, or temperature information). According to an embodiment of the present invention, the application 1370 may include an information exchanging application supporting information exchange between the electronic device and an external electronic device. Examples of the information exchange application may include, but is not limited to, a notification relay application for transferring specific information to the external electronic device or a device management application for managing the external electronic device. For example, the notification relay application may transfer notification information generated by other applications of the electronic device to the external electronic device or receive notification information from the external electronic device and provide the received notification information to the user. For example, the device management application may install, delete, or update a function (e.g., turn-on/turn-off the external electronic device (or some elements) or adjust the brightness (or resolution) of the display) of the external electronic device communicating with the electronic device or an application operating on the external electronic device. According to an embodiment of the present invention, the application 1370 may include an application (e.g., a health-care application of a mobile medical device) designated according to an attribute of the external electronic device. According to an embodiment of the present invention, the application 1370 may include an application received from the external electronic device. At least a portion of the program module 1310 may be implemented (e.g., executed) in software, firmware, hardware (e.g., the processor 210), or a combination of at least two or more thereof and may include a module, program, routine, command set, or process for performing one or more functions.

According to various embodiments of the present invention, a method of providing proximity-based information may comprise obtaining first context information from one or more programs executed on an electronic device, identifying first location information corresponding to the first context information, transmitting first data including at least one of the first context information and the first location information to a server through a communication interface of the electronic device, receiving, from the server, point-of-interest event information corresponding to the transmitted first data, and storing the received point-of-interest event information in a memory of the electronic device.

According to various embodiments of the present invention, in the method of providing proximity-based information, the first context information may include at least one of second data extracted from the one or more programs and at least one keyword received through an input interface provided in the electronic device.

According to various embodiments of the present invention, in the method of providing proximity-based information, the second data extracted from the one or more programs may include at least one of a keyword extracted from content provided through the one or more programs and a cookie for the one or more programs.

According to various embodiments of the present invention, in the method of providing proximity-based information, the first location information may include at least one of location information related to the first context information and location information about the electronic device identified when the first context information is obtained.

According to various embodiments of the present invention, in the method of providing proximity-based information, the point-of-interest event information may include at least one of location information about a point-of-interest, a method of discovering the point-of-interest, content related to the point-of-interest, and a recommendation index for the point-of-interest.

According to various embodiments of the present invention, the method of providing proximity-based information may comprise identify second location information corresponding to a current location of the electronic device, identify whether the electronic device is proximate to the point-of-interest based on the identified second location information and the first point-of-interest event information, and in a case where the electronic device is identified to be proximate to the point-of-interest at a preset distance, output content related to the point-of-interest.

According to various embodiments of the present invention, in the method of providing proximity-based information, identifying whether the electronic device is proximate to the point-of-interest may further include identifying whether the electronic device is proximate to the point-of-interest based on a method of discovering the point-of-interest included in the point-of-interest event information.

According to various embodiments of the present invention, in the method of providing proximity-based information, outputting the content may further include outputting the content using at least one method of displaying a user interface, outputting a sound signal, generating a vibration, or executing at least one program of the electronic device.

According to various embodiments of the present invention, there may be provided a computer-readable recording medium storing a program for executing a method of providing proximity-based information, the method comprising obtaining first context information from one or more programs executed on an electronic device, identifying first location information corresponding to the first context information, transmitting first data including at least one of the first context information and the first location information to a server through a communication interface of the electronic device, receiving, from the server, point-of-interest event information corresponding to the transmitted first data, and storing the received point-of-interest event information in a memory of the electronic device.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device that has been known or is to be developed in the future as performing some operations.

According to an embodiment of the present invention, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

The invention claimed is:

1. An electronic device providing proximity-based information, comprising:
   a communication interface;
   a memory; and
   a processor electrically connected with the communication interface and the memory, wherein the processor is configured to:
     obtain first context information from one or more programs executed on the electronic device,
     identify first location information based on the first context information,
     transmit first data including at least one of the first context information or the first location information to a server through the communication interface,
     receive, from the server, first point-of-interest event information corresponding to the transmitted first data, wherein the first point-of-interest event information includes content related to a point-of-interest and location information about the point-of-interest,
     store the received first point-of-interest event information in the memory,
     identify second location information based on a current location of the electronic device,
     identify whether the electronic device is proximate to the point-of-interest based on the identified second location information and the first point-of-interest event information, and
     output the content related to the point-of-interest by using the first point-of-interest event information, based on identifying that the electronic device is proximate to the point-of-interest at a preset distance.

2. The electronic device of claim 1, wherein the first context information includes at least one of second data extracted from the one or more programs or at least one keyword received through an input interface provided in the electronic device.

3. The electronic device of claim 2, wherein the second data extracted from the one or more programs includes at least one of a keyword extracted from content provided through the one or more programs or a cookie for the one or more programs.

4. The electronic device of claim 1, wherein the first location information includes at least one of location information related to the first context information or location information about the electronic device identified when the first context information is obtained.

5. The electronic device of claim 1, wherein the first point-of-interest event information further includes at least one of a method of discovering the point-of-interest, or a recommendation index for the point-of-interest.

6. The electronic device of claim 1, wherein the processor is configured to, based on recognition information about the point-of-interest being identified from the obtained first context information, store the recognition information and an identifier of an object, which has provided the recognition information, in the memory,
   transmit third data including identifiers of all objects, which have provided the recognition information, and the recognition information, in response to the number of pieces of the recognition information stored in the memory exceeding a preset number,
   receive, from the server, second point-of-interest event information corresponding to the transmitted third data, and store the received second point-of-interest event information in the memory.

7. A method of providing proximity-based information, the method comprising:
   obtaining first context information from one or more programs executed on an electronic device;
   identifying first location information based on the first context information;
   transmitting first data including at least one of the first context information or the first location information to a server through a communication interface of the electronic device;
   receiving, from the server, point-of-interest event information corresponding to the transmitted first data, wherein the point-of-interest event information includes content related to a point-of-interest and location information about the point-of-interest;
   storing the received point-of-interest event information in a memory of the electronic device;
   identifying second location information based on a current location of the electronic device;
   identifying whether the electronic device is proximate to the point-of-interest based on the identified second location information and the point-of-interest event information; and
   outputting the content related to the point-of-interest by using the point-of-interest event information based on identifying that the electronic device is proximate to the point-of-interest at a preset distance.

8. The method of claim 7, wherein the first context information includes at least one of second data extracted from the one or more programs or at least one keyword received through an input interface provided in the electronic device.

9. The method of claim 8, wherein the second data extracted from the one or more programs includes at least one of a keyword extracted from content provided through the one or more programs or a cookie for the one or more programs.

10. The method of claim 7, wherein the first location information includes at least one of location information related to the first context information or location information about the electronic device identified when the first context information is obtained.

11. The method of claim 7, wherein the point-of-interest event information further includes at least one of a method of discovering the point-of-interest, or a recommendation index for the point-of-interest.

12. A server providing proximity-based information, comprising:
   a communication interface;
   a memory; and a processor electrically connected with the communication interface and the memory, wherein the processor is configured to obtain at least one piece of point-of-interest information from one or more first electronic devices through the communication interface and store the at least one piece of point-of-interest information in the memory, receive, from a second electronic device through the communication interface, data including at least one of first context information related to the second electronic device or first location information corresponding to the first context information, identify point-of-interest information corresponding to the received data from among the at least one piece of point-of-interest information stored in the memory, generate at least one piece of point-of-interest event information using the received data and the identified point-of-interest information, and transmit the generated point-of-interest event information to the second electronic device.

13. The server of claim 12, wherein the processor is configured to receive at least one piece of feedback information from the second electronic device which has identified proximity to a point-of-interest based on the transmitted point-of-interest information and update the at least one piece of point-of-interest information stored in the memory using the received at least one piece of feedback information.

\* \* \* \* \*